United States Patent
Seed et al.

(10) Patent No.: US 12,526,344 B2
(45) Date of Patent: Jan. 13, 2026

(54) SERVICE LAYER METHODS FOR OFFLOADING IoT APPLICATION MESSAGE GENERATION AND RESPONSE HANDLING

(71) Applicant: IPLA Holdings Inc., New York, NY (US)

(72) Inventors: Dale N. Seed, Allentown, PA (US); Rocco Di Girolamo, Laval (CA); Quang Ly, North Wales, PA (US); Chonggang Wang, Princeton, NJ (US); Catalina Mihaela Mladin, Hatboro, PA (US); Zhuo Chen, Claymont, DE (US); William Robert Flynn, IV, Schwenksville, PA (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

(21) Appl. No.: 16/968,357

(22) PCT Filed: Feb. 8, 2019

(86) PCT No.: PCT/US2019/017203
§ 371 (c)(1),
(2) Date: Aug. 7, 2020

(87) PCT Pub. No.: WO2019/157274
PCT Pub. Date: Aug. 15, 2019

(65) Prior Publication Data
US 2021/0092202 A1    Mar. 25, 2021

Related U.S. Application Data

(60) Provisional application No. 62/628,326, filed on Feb. 9, 2018.

(51) Int. Cl.
*H04L 67/60* (2022.01)
*H04L 67/51* (2022.01)

(52) U.S. Cl.
CPC .............. *H04L 67/60* (2022.05); *H04L 67/51* (2022.05)

(58) Field of Classification Search
CPC ........ H04W 4/80; H04W 92/18; H04L 67/32; H04L 67/16
(Continued)

(56) References Cited

U.S. PATENT DOCUMENTS 10,088,818 B1 * 10/2018 Mathews ............... G05B 15/02
10,979,299 B1    4/2021 Askar
(Continued)

FOREIGN PATENT DOCUMENTS

CN    105487388 A    4/2016
WO    2017/152070 A1   9/2017

OTHER PUBLICATIONS

Wang et al., "RESTful information exchange among engineering tools for wireless sensor networks in home automation", 2015 International Conference on Computer, Information and Telecommunication Systems (CITS), Jul. 2015, 5 Pages.

*Primary Examiner* — Douglas B Blair
(74) *Attorney, Agent, or Firm* — XSENSUS LLP

(57) ABSTRACT

A service layer may be configured to offload requests and responses on behalf of IoT applications in order to reduce congestion and/or overhead on underlying networks, applications and devices. The service layer may be enabled with the capability to script and generate IoT application requests such that the requests can be initiated by the service layer without the IoT application having to re-issue the same request repeatedly (e.g., to periodically retrieve a sensor reading). This scripting may be initiated by request originators. The service layer may support the capability to monitor and detect repetitive request patterns and initiate the scripting itself. This scripting functionality may enable the service layer to perform operations on behalf of IoT appli- (Continued)

cations. As a result, the messaging overhead on IoT applications and devices as well as underlying networks can be minimized.

18 Claims, 16 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 11,720,571 B2* | 8/2023 | Evans | ...................... | H04L 67/12 |
| | | | | 709/246 |
| 2008/0064395 A1* | 3/2008 | Sibileau | ................. | G08C 17/02 |
| | | | | 455/433 |
| 2014/0244568 A1* | 8/2014 | Goel | ....................... | H04L 67/12 |
| | | | | 706/46 |
| 2015/0026244 A1* | 1/2015 | Hato | ..................... | H04L 69/321 |
| | | | | 709/203 |
| 2015/0351002 A1* | 12/2015 | Sankar | ................... | H04W 12/08 |
| | | | | 370/329 |
| 2015/0370615 A1* | 12/2015 | Pi-Sunyer | .............. | G08B 17/10 |
| | | | | 700/276 |
| 2016/0099815 A1* | 4/2016 | Park | ..................... | H04L 12/2816 |
| | | | | 370/254 |
| 2016/0139575 A1* | 5/2016 | Funes | .................... | G06N 5/047 |
| | | | | 700/275 |
| 2016/0191474 A1* | 6/2016 | Hinh | ................... | H04L 63/1408 |
| | | | | 718/1 |
| 2016/0234628 A1* | 8/2016 | Rahman | .............. | H04L 63/0823 |
| 2016/0234691 A1* | 8/2016 | Jeong | ................... | H04W 12/086 |
| 2016/0241439 A1* | 8/2016 | Idnani | ................. | H04L 41/0816 |
| 2016/0315816 A1 | 10/2016 | Fang | | |
| 2017/0238129 A1* | 8/2017 | Maier | ................... | H04W 4/025 |
| | | | | 455/404.2 |
| 2017/0339120 A1* | 11/2017 | Zakaria | ................. | H04L 9/0861 |
| 2017/0371937 A1 | 12/2017 | Shah et al. | | |
| 2017/0374155 A1 | 12/2017 | Chen | | |
| 2018/0014144 A1 | 1/2018 | Chen et al. | | |
| 2018/0261070 A1 | 9/2018 | Stevens et al. | | |
| 2018/0324671 A1 | 11/2018 | Palnati et al. | | |
| 2019/0088099 A1* | 3/2019 | Garg | ........................ | G06F 3/165 |
| 2020/0195545 A1* | 6/2020 | Chuang | ................... | H04L 43/50 |

* cited by examiner

SERVICE LAYER METHODS FOR OFFLOADING IoT APPLICATION MESSAGE GENERATION AND RESPONSE HANDLING

CROSS-REFERENCE TO RELATED APPLICATIONS

This application is the National Stage Application of International Patent Application No. PCT/US2019/017203 filed Feb. 8, 2019, which claims the benefit of U.S. Provisional Application No. 62/628,326 filed Feb. 9, 2018, the contents of which are hereby incorporated by reference in their entirety.

BACKGROUND

The oneM2M standard defines a service layer entity called a Common Service Entity (CSE). The purpose of a service layer entity is to provide "horizontal" services that can be utilized by different "vertical" machine-to-machine (M2M) systems and applications. The CSE of oneM2M supports four reference points, as shown in the example of FIG. 1. The Mca reference point interfaces with an Application Entity (AE). The Mcc reference point interfaces with another CSE within the same service provider domain. The Mcc' reference point interfaces with another CSE in a different service provider domain. The Mcn reference point interfaces with an underlying network service entity (NSE).

SUMMARY

Methods and systems are disclosed for enabling a service layer (SL) to offload requests and responses on behalf of IoT applications in order to reduce congestion and/or overhead on underlying networks, applications and devices. The SL may be enabled with the capability to script and generate IoT application requests such that the requests can be initiated by the SL without the IoT application having to re-issue the same request repeatedly (e.g., to periodically retrieve a sensor reading). This scripting may be initiated by request originators. Additionally or alternatively, the SL may support the capability to monitor and detect repetitive requests and initiate the scripting itself. The SL may script the processing of responses and perform operations such as batching, filtering and aggregation of responses based on a defined set of response handling criteria. This scripting functionality may enable the SL to perform operations on behalf of IoT applications. As result, the messaging overhead on IoT applications and devices as well as underlying networks can be minimized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
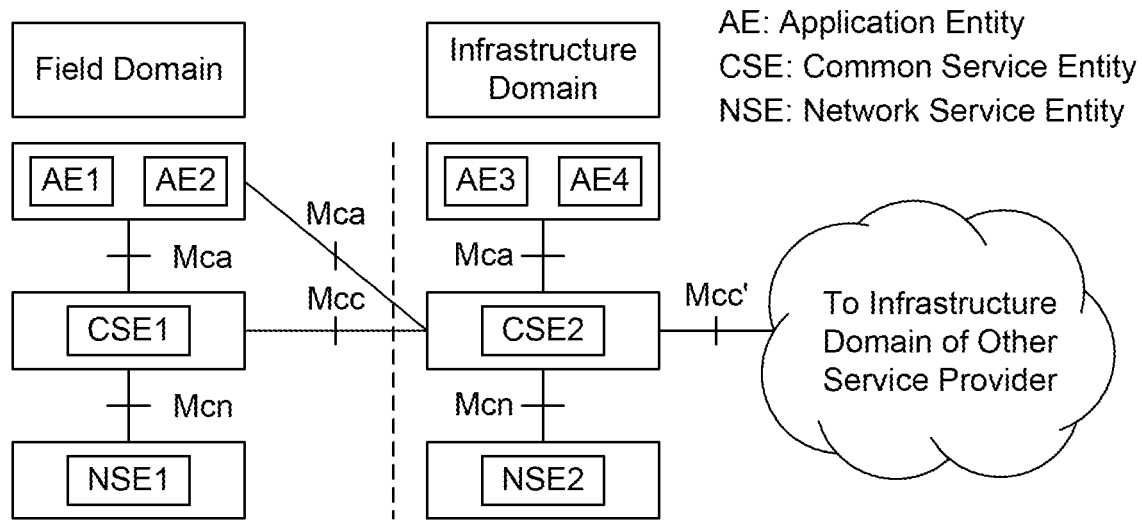
FIG. 1 shows an example oneM2M architecture.

In the terminology of the oneM2M standard, an NSE provides underlying network services to the CSEs, such as device management, location services and device triggering. A CSE may contain multiple logical functions called "Common Service Functions" such as "Discovery" and "Data Management & Repository." The oneM2M architecture may enable the following types of Nodes, as shown in FIG. 1:

Application Service Node (ASN): A node that contains one CSE and contains at least one Application Entity (AE). Example of a physical mapping: an ASN could reside in an M2M Device;

Application Dedicated Node (ADN): A node that contains at least one AE and does not contain a CSE. There may be zero or more ADNs in the Field Domain of the oneM2M System. Example of physical mapping: an ADN could reside in a constrained M2M device;

Middle Node (MN): A node that contains one CSE and contains zero or more AEs. There may be zero or more MNs in the Field Domain of the oneM2M System. Example of physical mapping: a MN could reside in an M2M Gateway;

Infrastructure Node (IN): A node that contains one CSE and contains zero or more AEs. There may be exactly one IN in the Infrastructure Domain per oneM2M Service Provider. A CSE in an IN may contain CSE functions not applicable to other node types. Example of physical mapping: an IN could reside in an M2M Service Infrastructure; and Non-oneM2M Node (NoDN): A Node that does not contain oneM2M Entities (neither AEs nor CSEs). Such Nodes may represent devices attached to the oneM2M system for interworking purposes, including management.

The oneM2M standard defines a <request> resource to enable a CSE to process an incoming request in a non-blocking fashion. This allows a CSE to return an acknowledgement that it received an originator's request and has begun processing it. When the CSE completes processing of the request, it may update the <request> resource with the results. The request originator can then be notified by the CSE. Additionally or alternatively, the originator can retrieve the <request> resource to obtain the results. Support of non-blocking request handling by the CSE frees up the request originator to do other work rather than being blocked waiting for the CSE to complete the processing of a request. The creation of a <request> resource may only be allowed by a CSE that receives and processes a request in a non-blocking manner. In one example, a request originator may not be allowed to create a <request> resource.

Figure 2:
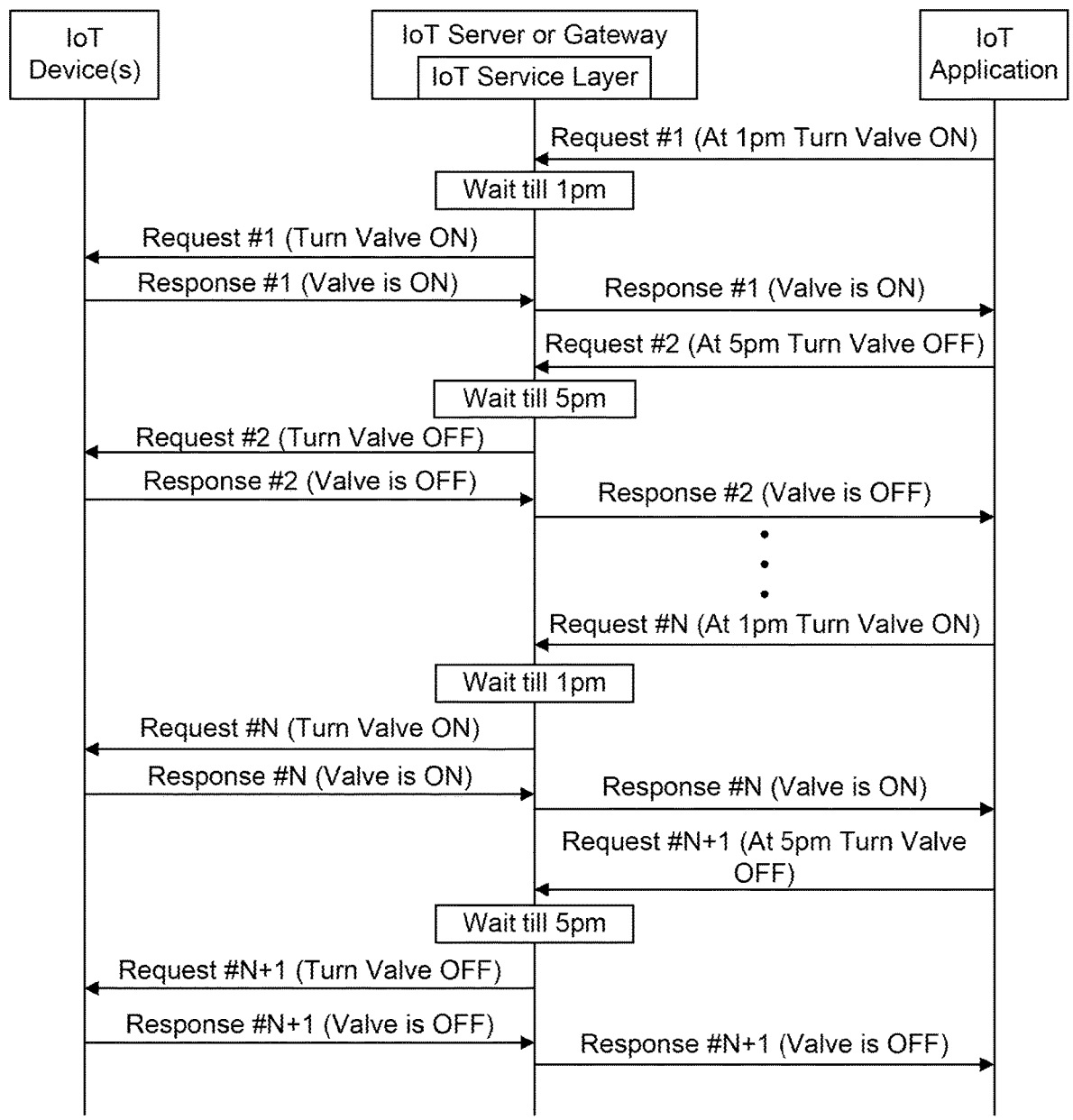
FIG. 2 shows a flow chart illustrating example interactions between an IoT application, an IoT service layer, and one or more IoT devices that control valves on an oil pipeline.

FIG. 2 shows a flow chart illustrating example interactions between an IoT application, an IoT service layer, and one or more IoT devices that control valves on an oil pipeline. In this example, the IoT application sends daily request messages to turn on/off specific valves at specific times to control the flow of oil. For example, daily at 1 pm, a request to turn on a certain valve and then turn it off again at 5 pm may be sent. This may require an IoT application and SL to exchange two sets of repetitive on/off request and response message pairs daily per valve.

Many types of IoT deployments involve a SL request originator (e.g., an IoT application) sending repetitive requests to control or sample the state of an IoT device, as illustrated in FIG. 2. This results in repetitive request and response exchanges between the request originators and the SL. Processing of these repetitive and redundant requests over time can result in considerable amounts of cumulative overhead to underlying networks, applications, devices and SLs. This is especially the case for bandwidth limited and resource constrained underlying networks and devices (e.g., battery powered devices). The overhead of repetitive request and response messaging represents a scalability issue for many IoT deployments. Reducing this overhead can allow IoT deployments to scale to handle increased numbers of devices while at the same time reducing deployment costs.

Enabling the SL to offload requests and responses on behalf of IoT applications can reduce congestion and/or overhead on underlying networks, applications and devices. A mechanism that is both customizable and extensible to allow IoT applications to offload request generation and response handling to the IoT SL is disclosed herein.

A SL may be enabled with the capability to script and generate IoT application requests such that the requests can be initiated by the SL without the IoT application having to re-issue the same request repeatedly (e.g., to periodically retrieve a sensor reading). This scripting may be initiated by request originators. Additionally or alternatively, the SL may support the capability to monitor and detect repetitive requests and initiate the scripting itself. The SL may also script the processing of responses and perform operations such as batching, filtering and aggregation of responses based on a defined set of response handling criteria. This scripting functionality may enable the SL to perform operations on behalf of IoT applications. As a result, the messaging overhead on IoT applications and devices as well as underlying networks can be minimized. The disclosed SL request and response scripting capability may enable edge-based/fog-based IoT deployments. Thus, an IoT SL deployed on an edge/fog node may be able perform operations on behalf of IoT applications closer to the edge of the network where IoT devices are deployed.

An IoT SL Message Scripting Service (MSS) is disclosed herein. The MSS may support one or more of the following capabilities:

The MSS can store SL request information in a SL scriptedRequest resource such that the MSS can use this information to generate requests on behalf of request originators;

The storing of request information in a scriptedRequest resource can be based on an explicit request from a request originator to instruct the MSS to create a scriptedRequest resource;

The MSS can auto-detect patterns of repetitive SL requests and autonomously create scriptedRequest resources on behalf of request originators to store request information. This auto-detection capability can be configurable. It can also be enabled or disabled for select request originators and/or request types;

The MSS can notify a request originator that it has auto-detected and recorded repetitive request(s) along with an offer to automatically generate future requests on the originator's behalf. Upon receiving this notification, a request originator can reply to the MSS to either accept or deny the offer;

Using information stored in a scriptedRequest resource, the MSS can offload the generation of SL requests from request originators and trigger the generation and processing of requests on their behalf;

For requests that are generated on behalf of a request originator, the MSS can perform response handling that can be based on response criteria defined in the scriptedRequest resource;

If/when multiple scriptedRequest resources are linked to one another, the MSS can issue a sequence of automated requests on behalf of a request originator; and If/when a scriptedRequest resource is linked to other types of SL resources, the MSS can generate a scripted request if/when trigger criteria defined by these other resource types have been met.

In an example, a method may comprise receiving, from a first entity, a plurality of requests to communicate with a second entity; determining that two or more of the plurality of requests to communicate with the second entity form a repetitive request pattern; creating, based on determining that two or more of the plurality of requests to communicate with the second entity form a repetitive request pattern, a scripted request resource, wherein the scripted request resource enables the service layer entity to send scripted requests to the second entity on behalf of the first entity, and wherein the scripted request resource comprises one or more conditions for triggering the generation of one or more scripted requests; and sending, to the second entity and based on determining that one or more of the conditions for triggering the generation of the one or more scripted requests has been satisfied, a scripted request.

The scripted request may be used by the service layer entity to communicate information to the second entity automatically on behalf of the first entity. The service layer entity may be configured with one or more policies that enable the service layer entity to determine whether the plurality of requests to communicate with the second entity form a repetitive request pattern. The method may further comprise receiving, from the first entity, an instruction to automatically create the scripted request resource based on determining at the service layer entity that two or more of the requests to communicate with the second entity form a repetitive request pattern. The method may further comprise sending, to the first entity, an indication that the scripted request resource has been created and an identifier of the scripted request resource. The method may further comprise receiving, from the first entity, a request to update a condition of the scripted request resource; and updating, based on the request to update the condition of the scripted request resource, the condition of the scripted request resource. The method may further comprise receiving, from the second entity, a response to the scripted request; processing, at the service layer entity and based on one or more response parameters identified in the scripted request resource, the response; and sending, to the first entity, the processed response.

In an example, a method may comprise receiving, from a first entity, a request to create a scripted request resource, the scripted request resource enabling the service layer entity to send scripted requests to a second entity on behalf of the first entity, the request to create the scripted request resource comprising an indication of one or more conditions for triggering the generation of a scripted request; creating, at the service layer entity, the scripted request resource; determining, at the service layer entity, that the one or more conditions for triggering the generation of a scripted request have been met; generating, at the service layer entity and in response to determining that the one or more conditions for triggering the generation of a scripted request have been met, a scripted request; and sending, to the second entity, the scripted request.

The request to create the scripted request resource may comprise one or more parameters for determining that the one or more conditions for triggering the generation of a scripted request have been met, the one or more parameters comprising one or more of the type of request sent by the first entity, an identifier of the first entity, an identifier of the second entity, a type of response to send to the second entity, and an expiration condition for the scripted request resource. The method may further comprise receiving, from the second entity, one or more responses based on the scripted request; and processing, at the service layer entity and based on one or more response parameters identified in the scripted request resource, the one or more responses. Processing the one or more responses may comprise at least one of batching the one or more responses, aggregating the one or more responses, and filtering the one or more responses. The method may further comprise sending, to the first entity, one or more of the processed responses. The request to create the scripted request resource may comprise a schema identifier, the schema identifier indicating a location of a schema that is useable by the service layer entity to create the scripted request. Generating the scripted request may comprise retrieving the schema identified by the schema identifier.

In an example, a method may comprise receiving, from a first entity, a request to create a plurality of scripted request resources, each of the plurality of scripted request resources enabling the service layer entity to send scripted requests to a device of a plurality of devices on behalf of the first entity, the request to create the plurality of scripted request resources comprising, for each of the scripted request resources, an indication of one or more conditions for triggering the generation of a scripted request; creating, at the service layer entity, the plurality of scripted request resources, at least one of the plurality of scripted request resources comprising a link to another one of the plurality of scripted request resources; determining, at the service layer entity, that one or more conditions for triggering the generation of a scripted request associated with a first one of the scripted request resources have been met; generating, in response to determining that one or more conditions for triggering the generation of a scripted request associated with a first one of the scripted request resources have been met, a scripted request associated with the first one of the scripted request resources; sending, to a first device of the plurality of devices, the scripted request associated with the first one of the scripted request resources; receiving, from the first device, one or more responses based on the scripted request associated with the first one of the scripted request resources; determining that the first one of the scripted request resources comprises a link to a second one of the scripted request resources; and generating a scripted request associated with the second one of the scripted request resources.

The method may further comprise sending, to second device of the plurality of devices, the scripted request associated with the second one of the scripted request resources; receiving, the second device, one or more responses based on the scripted request associated with the second one of the scripted request resources; determining that the second one of the scripted request resources comprise a link to a third one of the scripted request resources; and generating a scripted request associated with the third one of the scripted request resources. The method may further comprise processing, at the service layer entity and based on one or more response parameters identified in the scripted request resource, the one or more responses based on the scripted request associated with the first one of the scripted request resources. The request to create the plurality of scripted request resources may further comprise a plurality of schema identifiers, each of the plurality of schema identifiers indicating a location of a schema that is useable by the service layer entity to create a scripted request. Processing the one or more responses based on the scripted request associated with the first one of the scripted request resources may comprise at least one of batching the one or more responses, aggregating the one or more responses, and filtering the one or more responses. The method may further comprise sending, to the first entity, one or more of the processed responses.

Figure 3:
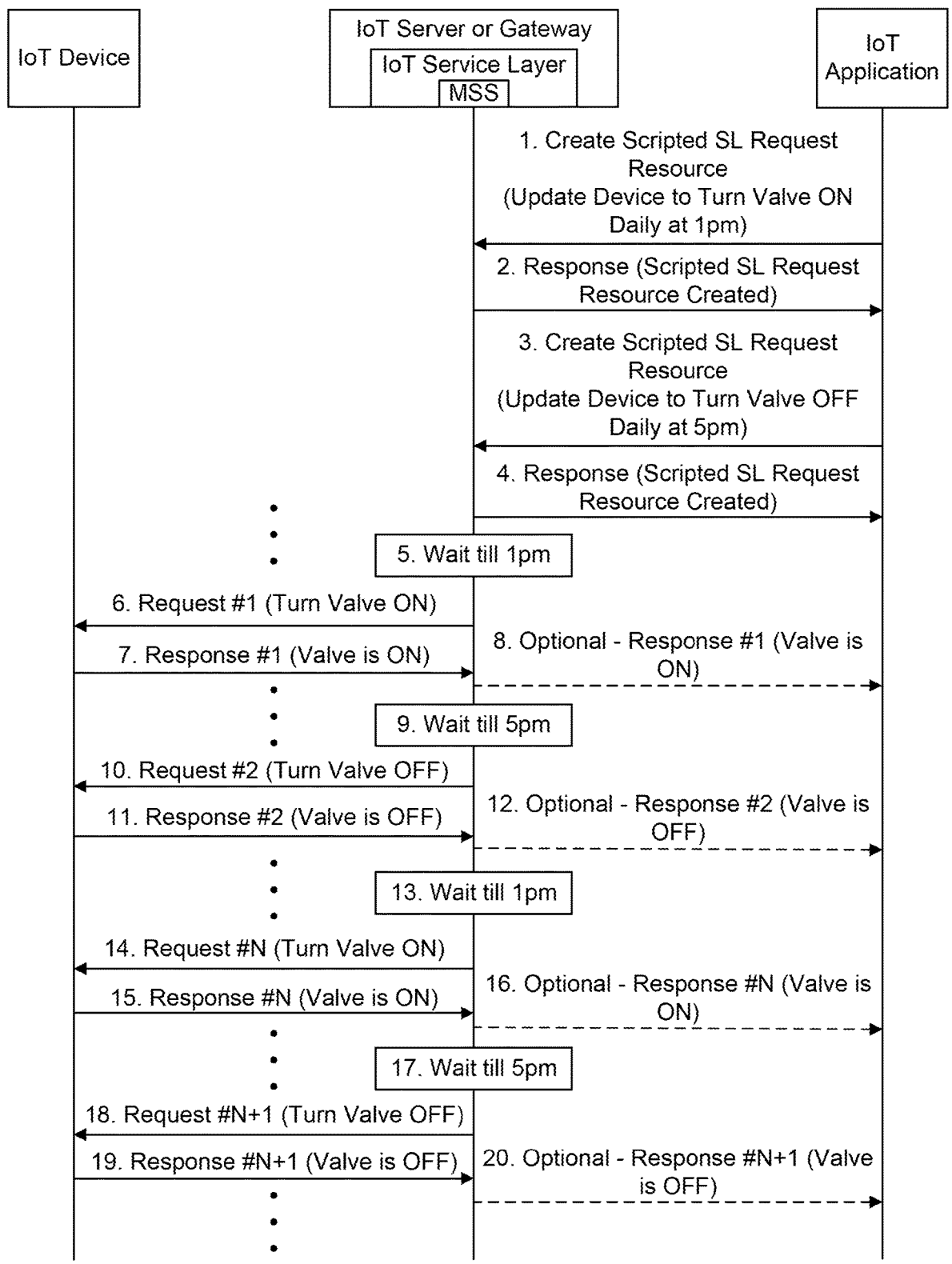
FIG. 3 shows an example flow chart illustrating the operation of a message scripting service (MSS)

FIG. 3 shows an example flow chart illustrating the operation of a message scripting service (MSS). In this example, an IoT application creates a first scripted SL request resource (e.g., as shown in Step 1 and Step 2) that results in the MSS creating a request on its behalf that is sent to an IoT device to turn on a valve at 1 pm daily (e.g., as shown in Step 5, Step 6 and Step 7). Likewise, the IoT application creates a second scripted SL request resource (e.g., as shown in Step 3 and Step 4) that results in the MSS creating a request to have an IoT device to turn off a valve at 5 pm daily (e.g., as shown in Step 9, Step 10 and Step 11). Based on the IoT application's preferences, it can optionally configure the scripted SL request resources it creates to have the MSS notify it of the responses it receives for scripted requests (e.g., as shown in Step 8, Step 12, Step 16 and Step 20). Although not shown in this example, an MSS may also detect patterns of repetitive requests and autonomously create scripted SL requests on behalf of request originators.

Although the examples shown below specifically mention repetitive message exchanges between IoT SLs and IoT applications, the disclosed methods and systems can also apply to repetitive message exchanges between two or more instances of IoT SLs or IoT SLs and IoT devices. Note that the MSS and/or IoT Service layer may reside on the IoT Device. In such a scenario, the IoT Device may be an IoT Application.

A SL can support a Message Scripting Service (MSS) capable of offloading the generation and processing of SL requests from request originators. For example, the SL can periodically retrieve the value of a sensor on behalf of an application and send the application a notification if/when the sensor's response includes a value that crosses a threshold value specified by the request originator.

The MSS may support the capability to allow SL request originators to configure the MSS with one or more SL requests to be scripted. Once configured, a requestor can then manually trigger the MSS to generate scripted request(s) in an on-demand fashion without having to send the actual request to the SL. The requestor can also configure the MSS with scripted request generation criteria to allow the MSS to auto-trigger itself and generate request(s) based on if/when the specified criteria have been met. Example criteria can include schedule information or a logical expression that can reference the state of one or more SL hosted resources.

The MSS may support the capability to auto-detect patterns of repetitive requests. When detecting a pattern of requests, the MSS may detect conditions (e.g., schedule, events, etc.) that trigger the generation of the requests. Using this information, the MSS can script these requests such that future requests can be generated and processed by the MSS on behalf of request originators. This automated detection and scripting of requests by the MSS can be policy driven. The MSS may be configured with policies that define scripting rules that control if/when the MSS performs automated request scripting The MSS may notify a request originator that it has detected repetitive request(s) and created scripted request(s). In this notification, the MSS can include an offer to automatically generate future request(s) on the requestor's behalf based on the scripted request(s). By responding to this notification, a request originator can either accept or reject the MSS's offer. If accepted, the MSS can automatically generate requests on behalf of a requestor based on request information that the MSS has recorded in the scripted requests.

The MSS may support the capability to allow requestors to query and discover one or more scripted SL requests supported by the MSS. Once discovered, a requestor can then manually trigger the MSS to generate a request based on the scripted request. The MSS can qualify the discovery and triggering of a scripted request by a requestor based on whether the requestor has the proper access privileges to the scripted request.

The MSS may support the capability to link multiple scripted requests together with one another. If/when multiple scripted requests are linked together, the MSS can issue a sequence of scripted requests on behalf of a requestor.

The MSS may support the capability to link a scripted request to other types of SL resources. In doing so, a MSS can trigger the generation of a scripted request if/when criteria defined by these other resource types have been met. For example, a scripted request can be linked to one or more of the following types of SL resources. This may result in the MSS triggering the generation and processing of a scripted request if/when:

A SL subscription resource's event notification criteria have been met; and/or

A SL transaction resource's execution criteria have been met.

After generating requests on behalf of a requestor, the MSS can perform scripted response handling on behalf of a requestor. This response handling can be based on one or more response handling policies. The MSS can support various response handling policies such as filtering, batching and aggregation of responses. By supporting these response handling capabilities, the MSS can provide increased levels of automation and offloading for its request originators. The MSS can offload the network by reducing the number of unwanted and repetitive responses that must be transmitted across the network. For example, responses that meet certain criteria defined by the applications can be returned and others that do not meet the criteria can be filtered by the SL and not returned to the request originator.

An MSS can support an API consisting of one or more types of resources that can be used to program the MSS with information regarding scripting of SL requests. In one example, the MSS can support a scriptedRequest resource. Each instance of this resource can define a scripted SL request that the MSS can use to generate repetitive requests on behalf of a requestor. Additional information related to a SL request may be stored in this resource such as when the request should be generated and how responses for the request should be handled. Multiple instances of this resource can be linked together to form a sequence of SL request primitives that the MSS can repeatedly generate on behalf of one or more requestors.

A scriptedRequest resource can support, but is not limited to, one or more of the following:

(1) A schema identifier that the MSS can use to fetch a schema that is used to create a valid SL request described by the scriptedRequest resource. This schema can include information such as the ordering of the elements in the request, what elements are mandatory and optional, the data type definitions of the values of each element, etc.

(2) One or more parameters that the MSS can use to generate and issue the SL request described by the scriptedRequest resource, such as but not limited to:
(a) type of request;
(b) originator specified content of request or a link to where content is stored;
(c) identifier of the request originator;
(d) one or more specified targets of the request;
(e) type of response that the originator desires;
(f) expiration time of the request; and
(g) time when request is to be executed by target(s).

(3) Criteria that the MSS can use as conditions for triggering the generation and issuing of the SL request described by the scriptedRequest resource, such as but not limited to:
(a) schedule information that controls when the MSS triggers generation and issuing of requests specified by the scriptedRequest;
(b) a logical expression that can reference the state of one or more SL hosted resources. The SL can use this expression to qualify whether to trigger the issuing of the request specified by the scriptedRequest or not; and (c) an expression that describes if the MSS should stop triggering the generation and issuing of the SL requests if certain responses or types of responses are received.

(4) One or more specified response targets that the MSS may return response(s) or notification(s) to when executing the request specified by the scriptedRequest;

(5) A mechanism to allow manually triggering the MSS (e.g., by an application) to generate a SL request based on the information specified in the scriptedRequest resource;

(6) A mechanism to allow manually enabling/disabling (e.g., by an application) the MSS from generating SL requests specified by the scriptedRequest resource; and (7) One or more specified response rules to control how the MSS processes the responses to the scripted requests. Some example rules may include the following:

(a) batching together responses for requests;

(b) filtering of responses for requests;

(c) aggregating the content of the responses for requests. This may include processing the content of the responses; and (d) periodic "heartbeat" acknowledgements that the script is running as specified An MSS may support a capability that allows requestors to script their own requests by manually programming the SL with one or more requests that the SL can issue and re-issue on behalf of the requestor. Once scripted, a requestor can then manually trigger the MSS to generate the request(s) on demand. In addition, the requestor can configure criteria that can be used by the MSS to trigger the generation of request(s) if/when the specified criteria have been met. The MSS may also allow requestors to discover, update or delete scripted requests.

Figure 4:
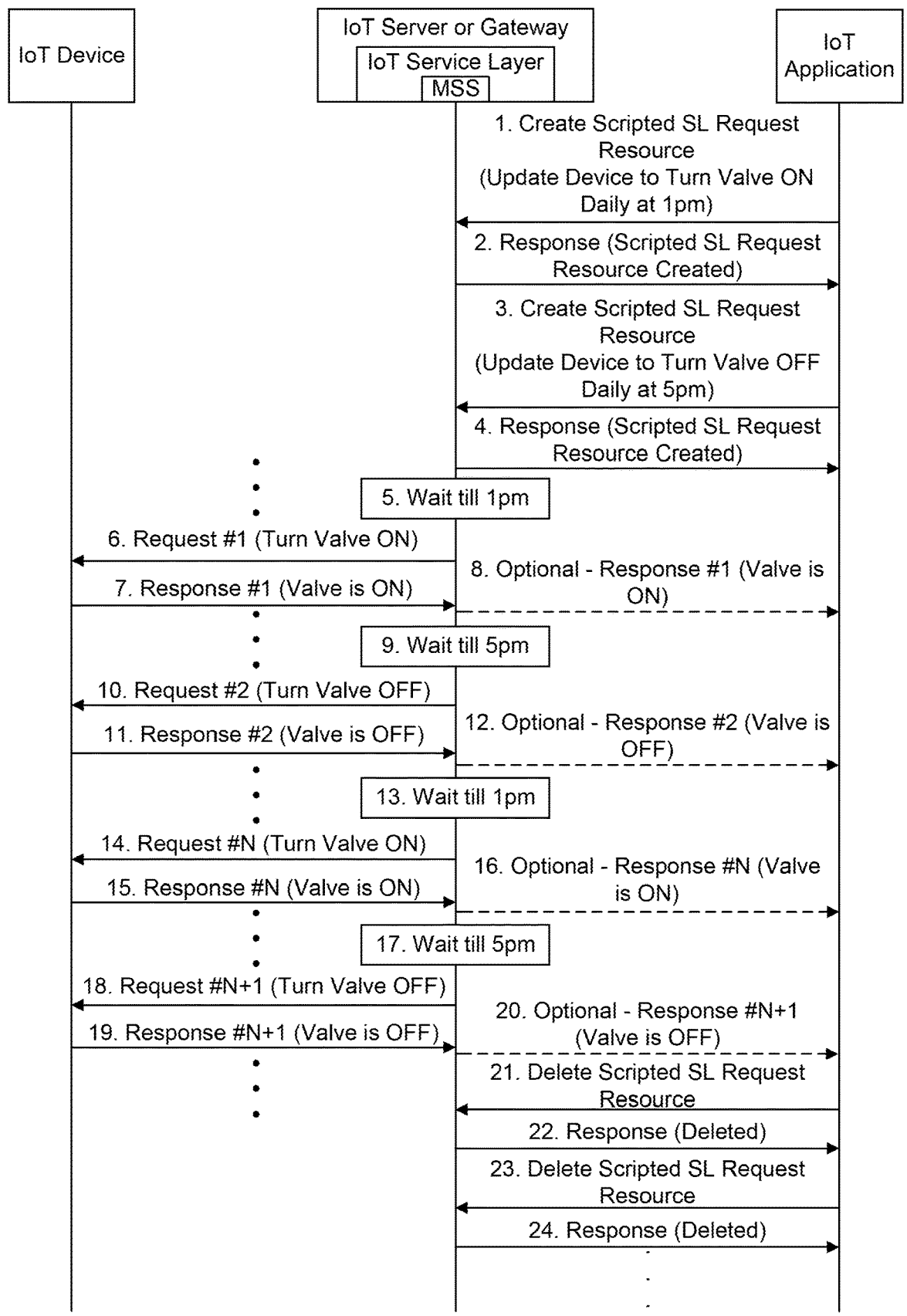
FIG. 4 shows a flow chart illustrating the manual creation of scripted service layer requests.

In one example, a requestor (e.g., an IoT application, device or another SL instance) can create a scriptedRequest resource hosted by a MSS. This scriptedRequest resource may be created manually. Once the scriptedRequest resource is created, it can be used by the requestor (or another requestor) to trigger the MSS to generate and issue a request one or more times. Once triggered, the MSS can issue a request on behalf of the requestor and process the response using information and criteria specified in the scriptedRequest resource. Generating requests and handling responses in this manner can reduce the number of messages that requestors need to send and receive, especially for cases where requests and responses are repetitive in nature. FIG. 4 shows a flow chart illustrating the manual creation of scripted service layer requests.

At step 1, a requestor (e.g. an IoT application) sends a request to the MSS to create a scriptedRequest resource for the purpose of having the MSS generate and send scripted requests on behalf of the requestor to an IoT device to turn a valve ON daily at 1 pm. The request may be configured with information such as but not limited to the following:

(1) A schema identifier that the MSS can use to fetch a schema that is used to create a valid SL request described by the scriptedRequest resource;

(2) One or more parameters that the MSS can use to generate and issue the SL request described by the scriptedRequest resource such as but not limited to:

(a) type of request;

(b) originator specified content of request or a link to where content is stored to be inserted into the request;

(c) identifier of the request originator;

(d) one or more specified targets (e.g. resources, applications, devices or services) of the request;

(e) type of response that originator wants in return (e.g. batched, non-batched, aggregated, non-aggregated, filtered, non-filtered);

(f) expiration time after which the MSS stops generating scripted request;

(g) time when request is to be executed by target(s); and (h) security keys or authorization tokens that can be included in the request so that the recipient of the scripted request can determine that the MSS is authorized to send requests to the recipient on behalf of the originator.

(3) One or more execution criteria that the MSS can use as conditions for triggering the generation and processing of the SL request described by the scriptedRequest resource, such as but not limited to:

(a) schedule information that controls when the MSS triggers generation and issuing of requests specified by the scriptedRequest;

(b) a logical expression that can reference the state of one or more SL hosted resources. The MSS can use this expression to qualify whether to trigger the generation and issuing of the request specified by the scriptedRequest or not;

(c) a specified number of times the MSS should generate a SL request described by the scriptedRequest resource;

(4) One or more specified targets that the MSS shall return response(s) to when executing the request specified by the scriptedRequest;

(5) An indicator that controls whether the scriptedRequest resource is enabled/disabled and whether the MSS should attempt to process and send requests based on it or not;

(6) One or more specified response criteria to control how the MSS should handle the processing of responses of requests specified by the scriptedRequest resource, such as but not limited to:

(a) batching together responses based on one or more of the following:

(i) a max number of responses to be batched together into a single batched response; and (ii) a max duration of time to batch responses together into a single batched response;

(b) filtering of responses for requests based on one or more of the following:

(i) only returning responses for requests that result in an error; and (ii) only returning responses that contain data with a value that matches a specified value and operator such as <, >, <=, =>, =, !=.

(c) Aggregating of responses based on one or more of the following:

(i) a max number of responses to be aggregated together into a single aggregated response; and (ii) a max duration of time to aggregate responses together into a single aggregated response; and (iii) the type of aggregation to perform such as:

A. Within a specified time duration, analyze one or more response elements in each received response against a specified aggregation criteria and find the response(s) that meet the aggregation criteria. For example, within a specified time duration, find the received response having the minimum value defined for a particular element;

B. Within a specified time duration, count the number of responses having element(s) that match a specified criteria;

C. Within a specified time duration, perform a cumulative operation spanning across all the received responses. For example, perform a cumulative sum or average of one or more elements in a response; and D. Within a specified time duration, perform a cumulative concatenation across all the received responses. For example, if the responses contain a string value, the aggregated response may be a comma separated combination of these strings.

At step 2, the MSS creates the scriptedRequest resource and returns a response to the requestor informing it that the resource was created successfully.

At step 3, a requestor sends a request to the MSS to create a scriptedRequest resource for the purpose of having the MSS generate and send scripted requests on behalf of the requestor to an IoT device to turn a valve OFF daily at 5 pm. The request is configured with similar information as described in Step 1.

At step 4, the MSS creates the scriptedRequest resource and returns a response to the requestor informing it that the resource was created successfully.

At step 5, the MSS monitors the execution criteria specified within each scriptedRequest resource to determine if/when the proper conditions have been met for it to generate a scripted request. In this example, the criteria is schedule based (e.g., at 1 pm, the MSS detects that the proper criteria have been satisfied for it to trigger the generation of a scripted request to turn ON the valve). In the event that the criteria is based on a logical expression contingent on the state of one or more other SL hosted resources, the MSS can monitor the state of these resources to determine if/when their collective state satisfies the criteria for generating a scripted request. Additionally or Alternatively, the MSS can be triggered by an application which can send a trigger request to the MSS.

At step 6, once triggered, the MSS uses information specified in the scriptedRequest resource to generate a scripted request. The MSS may perform operations such as but not limited to the following:

(1) Fetching the schema specified by the scriptedRequest's schema identifier and using this schema to determine, for example, what informational elements are required in the scripted request, the proper order of the elements, and their data types.

(2) For each element specified in the schema, the MSS first attempts to find the corresponding attribute name specified in the scriptedRequest resource. If found, the MSS assigns the value specified in the attribute to the corresponding element within the scripted request that the MSS is generating. Some examples of typical types of elements may include:

(a) type of request;
(b) originator specified content of request or a link to where content is stored;
(c) identifier of the request originator;
(d) identifier of the target or group of targets of the request;
(e) time when the target should execute the request;
(f) time when the target should consider the request expired and not execute it;
(g) time when a response is needed by;
(h) priority of the request; and
(i) requested format of the response (3) For any element specified in the schema that the MSS cannot find a matching scriptedRequest resource attribute, the MSS can assign a value if applicable. The assignment of these values can be based on MSS local policies or knowledge that the MSS has learned from monitoring prior requests and the value of these elements in those requests. For example, the MSS can assign values to elements in requests, such as but not limited to:

(a) unique identifier for the request;
(b) whether the request can be serviced in a blocking or non-blocking manner; and/or
(c) Any of the previously mentioned scriptedRequest attributes;

(4) For each target specified within the scriptedRequest resource, the MSS generates a request and sends it to the target either individually or as a group request.

At step 7, a request is received and processed by the target. The target then returns a response to the MSS.

At step 8, when receiving response(s) from target(s) for a given scripted request, the MSS can examine the response criteria specified in the scriptedRequest resource that was used to generate the scripted request to determine how to process the response(s). Based on the response criteria the MSS can perform operations such as but not limited to the following:

(1) Batch (e.g., concatenate) together a specified number of individual responses by concatenating them into a single message before returning the batched set of responses to the requestor;

(2) Batch (e.g., concatenate) together individual responses into a single message by concatenating them into a single message for a specified time duration or schedule before returning the batched set of responses to the requestor;

(3) Aggregate together a specified number of individual responses by processing and consolidating the responses into a single response and returning the response to the requestor;

(4) Aggregate together individual responses by processing and consolidating the responses into a single response for a specified time duration or schedule before returning the response to the requestor; and (5) Filter responses and only return responses to the requestor if certain filter conditions have been met. Filter conditions may include but are not limited to the following:

(a) Only returning responses for requests that result in an error; and/or
(b) Only returning responses that contain one or more elements with values that match a specified conditional operator such as $<, >, <=, =>, =, !=$ and a value. The value can be an explicit value or a reference to a resource whose current value can be used.

At step 9, the MSS monitors the criteria specified within each scriptedRequest resource to determine if/when the proper conditions have been met for it to generate a scripted request. In one example, the criteria is schedule based (e.g., at 5 pm, the MSS detects that the proper criteria have been satisfied for it to trigger the generation of a scripted request to turn OFF the valve).

Steps 10-12 may be the same as steps 6-8.
Steps 13-16 may be the same as steps 5-8.
Steps 17-20 may be the same as steps 9-12.

At step 21, a requestor (e.g., and IoT Application) sends a request to the MSS to delete the scriptedRequest resource for turning on the valve at 1 pm to stop the MSS from generating scripted requests on its behalf. Additionally or alternatively, scriptedRequest resources can be deleted by the MSS when a requestor dis-enrolls or de-registers from the SL, or when the MSS detects that one or more targets of the scriptedRequest are no longer available or responding, or when the MSS detects that the execution criteria have expired (e.g., max number of requests issued, schedule has expired, etc.). When a scriptedRequest resource is deleted by a Requestor and the MSS has outstanding requests that it has not yet received responses back for, the MSS can cancel the request and drop any responses that may be received. Alternatively, the MSS can instead block the deletion request until all outstanding requests have been completed and responses processed before deleting the scriptedRequest.

At step 22, MSS returns a response for the delete request indicating it has deleted the scriptedRequest resource and thus will no longer generate scripted requests for it.

Steps 23-24 may be the same as steps 21-22.

In one example, a requestor may manually trigger the SL to generate a scripted request by updating the scriptedRequest resource. Thus, the MSS may generate a scripted request on behalf of the requestor.

Figure 5:
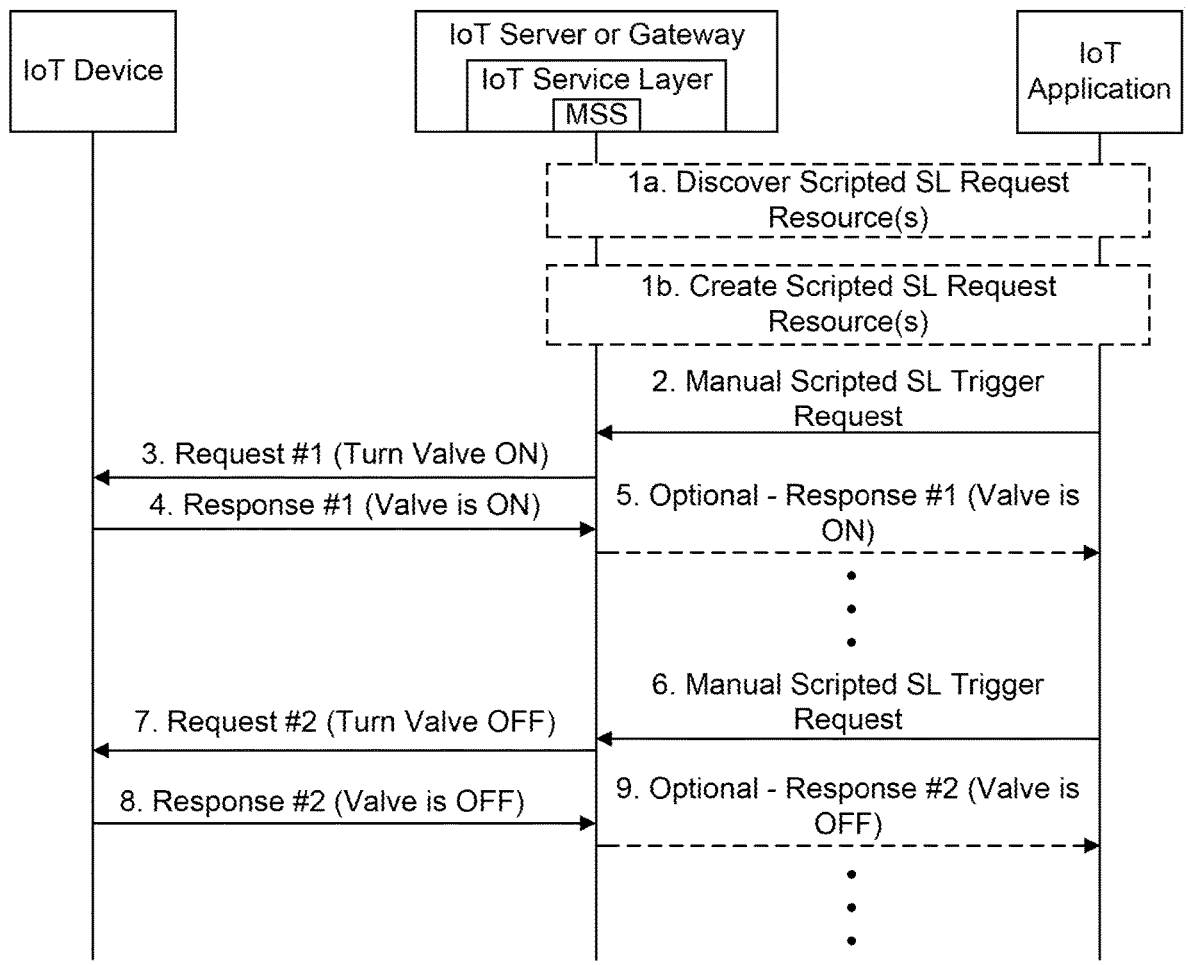
FIG. 5 shows a flow chart illustrating the manual triggering of a scripted service layer request.

Although manual triggers may require a request message to be sent between the requestor and MSS for each scripted request that is generated by the MSS, cost savings can still be realized since these trigger requests can be made smaller than normal requests and hence network bandwidth usage can still be optimized. In addition, other benefits of scripted requests can also be realized such as simplification of application and device logic, batching, aggregating, and filtering of responses. FIG. 5 shows a flow chart illustrating the manual triggering of a scripted service layer request.

At step 1a (optional), a requestor (e.g. an IoT application) sends request(s) to the MSS to discover scriptedRequest resource(s) that match one or more specified query criteria. For example, find a scriptedRequest resource that can be used to turn on/off a particular valve.

At step 1b (optional), a requestor sends request(s) to the MSS to create scriptedRequest resource(s) for the purpose of having the MSS generate and send scripted requests on behalf of the requestor to an IoT device to turn a valve ON and OFF.

At step 2, a requester sends a manual request to trigger the MSS to generate a scripted request for a specified scriptedRequest resource. This trigger request can be realized via a RESTful UPDATE operation that targets an attribute or a virtual child resource of the scriptedRequest resource. The MSS can interpret an UPDATE operation as an indication that it should generate a scripted request. In addition to a trigger indication in the UPDATE, the requester can also include additional information to modify certain attributes in the scriptedRequest (e.g. the target). This can allow a scriptedRequest resource to be re-used and adapted rather than generating separate and individual scriptedRequest resources.

At step 3, once triggered, the MSS uses information specified in the scriptedRequest resource to generate a scripted request.

At step 4, a request is received and processed by the target. The target then returns a response to the MSS.

At step 5 (optional), when receiving a response from a target for a given scripted request, the MSS can examine the response criteria specified in the scriptedRequest resource that was used to generate the scripted request to determine how to process the response.

Steps 6-9 may be the same as steps 2-5.

Figure 6:
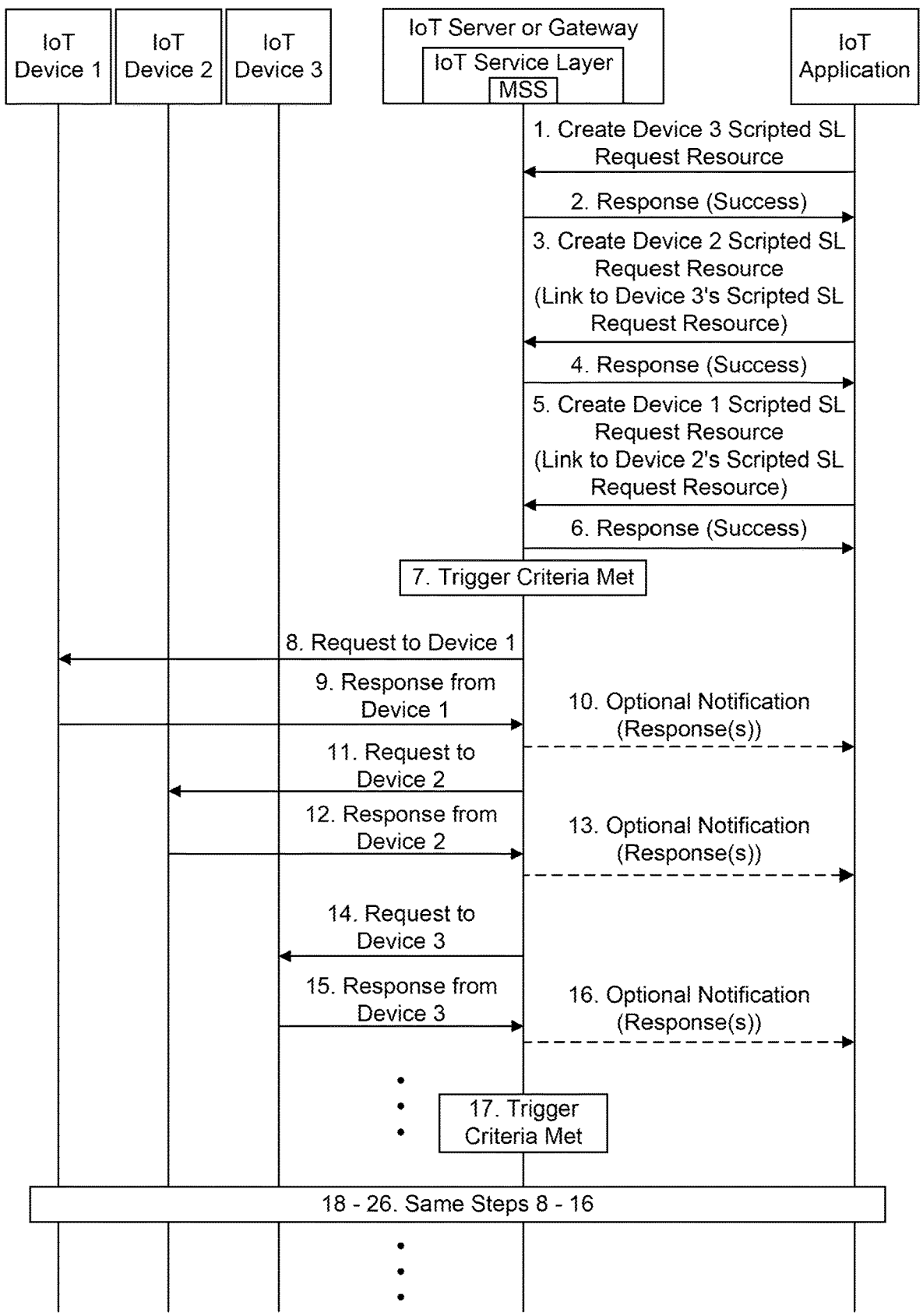
FIG. 6 shows an example flow chart illustrating the manual creation of a scripted sequence of service layer requests.

In one example, a requestor (e.g. an IoT application) can create a sequence of scriptedRequest resources hosted on a SL. Once the sequence of scriptedRequest resources is created, it can be used by the requestor or another requestor to trigger the SL to generate and issue a sequence of requests. Upon being triggered, the SL can issue a sequence of requests on behalf of the requestor and process the responses using information and criteria specified in the scriptedRequest resources. Generating requests and handling responses in this manner can reduce the size and number of messages flowing between requestors and the SL, especially for cases where requests and responses are repetitive in nature. FIG. 6 shows an example flow chart illustrating the manual creation of a scripted sequence of service layer requests.

At steps 1-6, a requestor (e.g. an IoT application) sends requests to the MSS to create three scriptedRequest resources for sending scripted requests on behalf of the requestor to IoT Devices 1, 2 and 3, respectively. In addition to being configured with their respective SL request parameters, the scriptedRequest resources may also configured as follows:

(1) The scriptedRequest resource for Device 1 may be configured with a link to the scriptedRequest resource for Device 2. This link may be used by the MSS to detect a scripted request sequence relationship.

(2) The scriptedRequest resource for Device 2 may be configured with a link to the scriptedRequest resource for Device 3. This link may be used by the MSS to detect a scripted request sequence relationship.

(3) The scriptedRequest resource for Device 3 may not be configured with a link.

At step 7, the MSS monitors the criteria specified within each scriptedRequest resource to determine if/when the proper conditions have been met for it to generate a scripted request. In this example, the criteria for the scriptedRequest associated with Device 1 is eventually satisfied.

At step 8, the MSS uses information specified in the scriptedRequest resource for Device 1 to generate a scripted request.

At step 9, a request is received and processed by Device 1. Device 1 returns a response to the MSS.

At step 10 (optional), when receiving a response from Device 1 for the scripted request, the MSS can examine the response criteria specified in the same scriptedRequest resource that was used to generate the scripted request to determine how to process the response.

At step 11, the MSS checks the scriptedRequest resource for Device 1 to see if it has any scripted request sequence relationships with other scriptedRequest resources. The MSS does this by checking to see if a link to another scriptedRequest resource is configured within the scriptedRequest resource for Device 1. In this example, it finds a scripted request sequence relationship to the scriptedRequest resource for Device 2. Based on this, the MSS triggers the generation of a scripted request for Device 2.

At step 12, a request is received and processed by Device 2. Device 2 returns a response to the MSS.

Step 13 (optional) may be the same as step 10.

At step 14, the MSS checks the scriptedRequest resource for Device 2 to see if it has any scripted request sequence relationships with other scriptedRequest resources. The MSS does this by checking to see if a link is configured within the scriptedRequest resource for Device 2 to another scriptedRequest resource. In this example, it finds scripted request sequence relationship to the scriptedRequest resource for Device 3. Based on this, the MSS triggers the generation of a scripted request for Device 3.

At step 15, a request is received and processed by Device 3. Device 3 returns a response to the MSS.

Step 16 (optional) may be the same as step 10.

Step 17 (optional) may be the same as step 7.

Steps 18-26 may be the same as steps 8-16.

Figure 7:
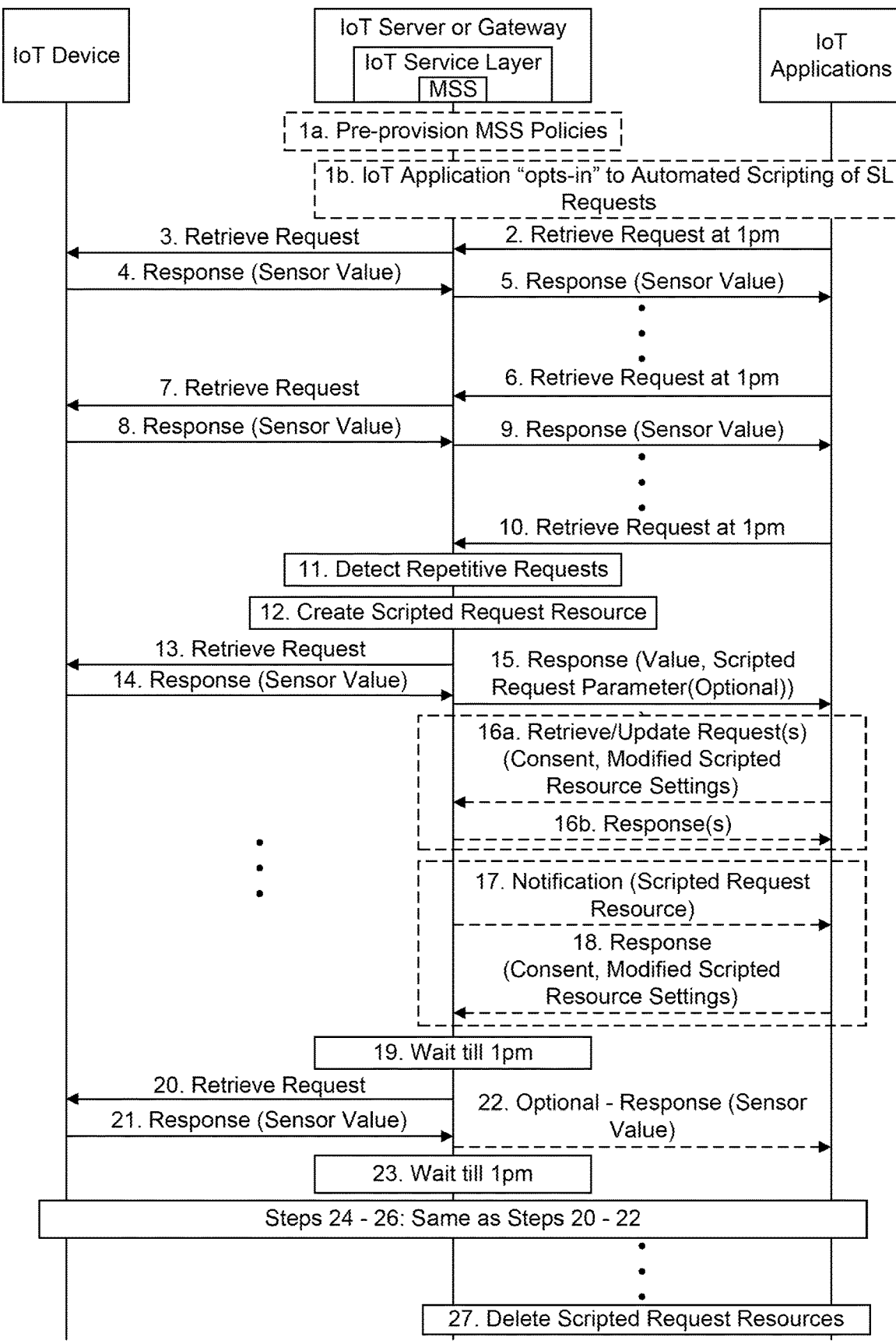
FIG. 7 shows an example flow chart illustrating the automated creation of scripted service layer requests.

In one example, a MSS can support a capability to autonomously create a scriptedRequest resource upon detecting a repetitive request from a requestor. The MSS may make use of rules defined within MSS policies to determine whether a request that it processes is repetitive. Upon detecting a repetitive request, the MSS may create a scriptedRequest resource and record the repetitive request information within the resource. The MSS may notify the requestor to inform them that the scriptedRequest has been created. In turn, the requestor may decide whether to give their consent to the MSS to start generating scripted requests on their behalf. If consent is given, a SL may issue a scripted request on behalf of a requestor and process the response using information and criteria specified in the scriptedRequest resource. The response criteria may be configured based on MSS policies as well as based on input from requestors. FIG. 7 shows an example flow chart illustrating the automated creation of scripted service layer requests.

At step 1a (optional), the MSS is configured with one or more policies that specify rules that the MSS uses to detect requests that qualify for automated scripting by the MSS. The rules can include information such as but not limited to the following:

Max amount of timing variation allowed between repetitive requests. If the variation in time is exceeded, the request is not considered a candidate for scripting; and A list of specified request elements (e.g. target, label, operation, content, etc.). For a request to be considered repetitive and a candidate for scripting, the value of each of the elements in this list may need to match across all requests in the detected sequence.

At step 1b (optional), the MSS can support a capability to allow requestors to opt-in/out of automated scripted request processing by the MSS. When opting in, the requestor can configure the MSS with a notification address for which the MSS can send it scripted request notifications. If a requestor opts-in, then the MSS can monitor requests received from the requestor to determine whether opportunities exist for the MSS to perform automated scripted request handling. When the requestor opts-in, it may indicate that it is only opting-in for requests that target certain destinations. If a requestor opts-out, then the MSS may not monitor requests received from the requestor.

At steps 2-10, a requestor starts to issue repetitive requests to retrieve the value of a sensor hosted by an IoT device every day at 1 pm.

At step 11, the third time the requestor performs the retrieve request, the MSS detects a repetitive request pattern. The detection can be based on rules configured within MSS policies as described in step 1a.

At step 12, based on the detection of a repetitive request pattern, the MSS creates a scriptedRequest resource.

At steps 13-15, the MSS completes processing the third request and returns a response to the requestor. In the response to the requestor, the MSS can optionally include an indication that it created a scriptedRequest resource on behalf of the requestor along with either a URI or some identifier of the scriptedRequest resource. The requestor may then give its consent targeting the URI or identifier.

At step 16 (optional), after receiving a response or notification that includes an MSS indication that a scriptedRequest resource was created, a requestor can retrieve and/or update the scriptedRequest resource to perform operations such as but not limited to one or more of the following:

Provide consent to allow the MSS to script requests on its behalf. This consent can be given by activating the scriptedRequest resource (e.g. via configuring and enable/disable attribute in the resource); and Update some settings that the MSS configured in the scriptedRequest resource based on the preferences of the requestor. For example, configure the response criteria, configure the request expiration timers, etc.

At step 17 (optional), instead of returning an indication in the response to the requestor as defined in step 15, the MSS can send a notification request to the requestor to notify it that the MSS created a scriptedRequest resource on the requestor's behalf. The notification target address of the requestor can be configured when the requestor opts-in (e.g., during enrollment, registration, etc.). Within the notification, the MSS can include scriptedRequest information such as the representation or an identifier of the scriptedRequest resource. This information can be used by the requestor to determine which request has been scripted and whether it would like the MSS to script this request on its behalf. If consent is given, the request originator may stop generating requests and let the MSS generate requests on its behalf.

At step 18 (optional), to opt-in and give the MSS consent to have it generate scripted requests on its behalf, the requestor can return a notification response to the MSS. In the response, the requestor can include consent information as well as some updates to settings that the MSS configured in the scriptedRequest resource. For example, configure the response criteria, configure the request expiration timers, etc.

At step 19, the MSS monitors the criteria specified within the scriptedRequest resource to determine if/when the proper conditions have been met for it to generate a scripted request. In this example, the criteria is schedule based (e.g., at 1 pm, the MSS detects that the proper criteria have been satisfied for it to trigger the generation of a scripted request).

At step 20, once triggered, the MSS uses information specified in the scriptedRequest resource to generate a scripted request.

At step 21, a request is received and processed by the target. The target then returns a response to the MSS.

At step 22, when receiving a response from a target for a given scripted request, the MSS can examine the response criteria specified in the scriptedRequest resource that was used to generate the scripted request to determine how to process the response.

Steps 23-26 may be the same as steps 19-22.

At step 27, a requestor sends a request to the MSS to delete a scriptedRequest resource to stop the MSS from generating scripted requests on its behalf. Additionally or alternatively, scriptedRequest resources can be deleted by the MSS when a requestor dis-enrolls or de-registers from the SL or when the MSS detects that one or more targets of the scriptedRequest are no longer available or responding.

In one example, an MSS can support a capability to autonomously create a sequence of scriptedRequest resources upon detecting a repetitive sequence of requests from one or more requestors. The MSS can make use of rules defined within SL policies to determine whether requests that it processes are a sequence of repetitive requests. Upon detecting a sequence of repetitive requests, the MSS can create an individual scriptedRequest resource to store information for each request in the sequence. The MSS can link together the individual scriptedRequest resources using a link attribute of the scriptedRequest resource. Within this attribute, the MSS can store the identifier of the next scriptedRequest resource in the sequence. The MSS can optionally notify the requestor(s) to inform them that the sequence of scriptedRequest resources has been created. Requestor(s) can give their consent to the MSS to generate a sequence of requests on their behalf. If consent is given, a MSS can issue a sequence of requests on behalf of requestor(s) and process the responses using information and criteria specified in the scriptedRequest resources.

An MSS may support detecting patterns of sequenced requests in which the individual requests originate from more than one requestor. Hence, the MSS can not only script sequences of requests from an individual requestor, but it can also script sequences of requests originating from multiple requestors.

Figure 8:
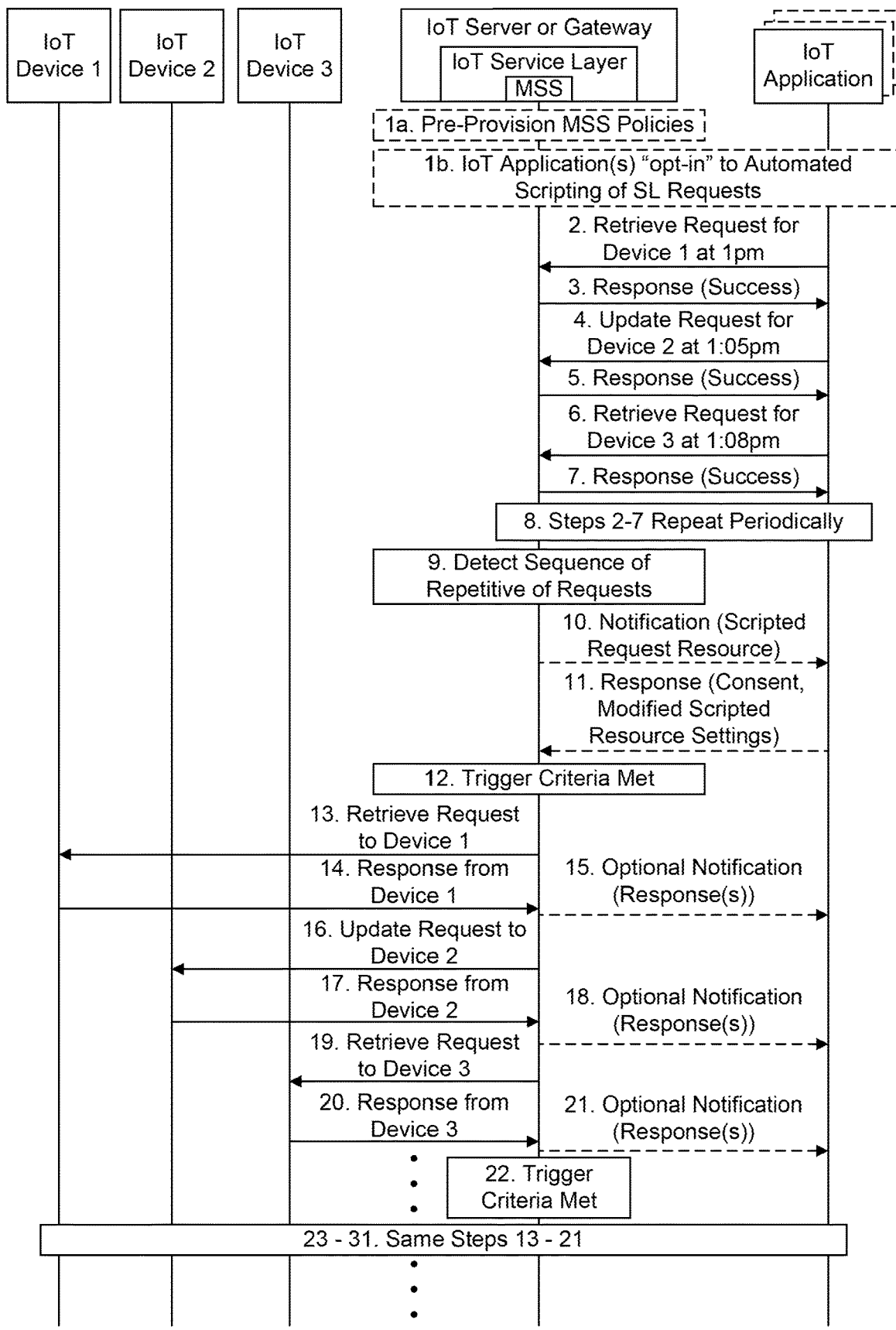
FIG. 8 shows an example method for automated creation of a scripted sequence of SL requests.

FIG. 8 shows an example method for automated creation of a scripted sequence of SL requests.

At step 1a (optional), the MSS is configured with one or more policies that specify rules that the MSS uses to detect a repeating sequence of requests that qualify for automated scripting by the MSS. The rules can include information such as but not limited to the following:

Max amount of timing variation in successive iterations of a repeating sequence of requests. If the variation in time is exceeded, the sequence may not be considered a candidate for scripting; and A list of specified request elements (e.g., target, label, operation, content, etc.). For a sequence of requests to be considered repeating and a candidate for scripting, the value of each of the elements in this list may need to match across corresponding requests in successive iterations of a sequence of requests.

At step 1b (optional), the MSS can support a capability to allow requestors to opt-in/out to automated scripting of request sequences. If a requestor opts-in, then the MSS can monitor requests received from the requestor as well as other requestors to determine whether opportunities exist for the MSS to perform automated scripting of a repetitive sequence of requests. If a requestor opts-out, then the MSS may not monitor requests received from the requestor.

At steps 2-8, one or more requestors start to issue repetitive sequences of requests.

At step 9, the MSS detects a repetitive sequence of requests. The detection can be based on rules configured within MSS policies as described in Step 1a. Based on the detection of a repetitive sequence of requests, the MSS creates scriptedRequest resources for each request in the sequence.

At step 10 (optional), the MSS can send a notification request to the requestor(s) to notify them that the MSS created one or more scriptedRequest resources on their behalf. The notification target address of the requestor(s) can be configured when the requestor(s) opts-in (e.g. during enrollment, registration, etc.). Within the notification, the MSS can include scriptedRequest information such as the representation or identifier of one or more scriptedRequest resources. This information can be used by the requestor to determine which request(s) are applicable to the scriptedRequest resource(s) and whether it would like MSS to script requests on its behalf.

At step 11 (optional), to opt-in and give the MSS consent to have it generate scripted request(s) on its behalf, a requestor can return a notification response to the MSS. In the response, the requestor can include consent information as well as some updates to settings that the MSS configured in the scriptedRequest resource(s). For example, configure the response criteria, configure the request expiration timers, etc.

At step 12, the MSS monitors the criteria specified within the scriptedRequest resources to determine if/when the proper conditions have been met for it to generate a scripted sequence of requests. In this example the criteria may be schedule based (e.g., At 1 pm, the MSS detects that the proper criteria have been satisfied for it to trigger the generation of the first scripted request in the sequence).

At step 13, the MSS uses information specified in the first scriptedRequest resource in the sequence to generate a scripted request for Device 1.

At step 14, a request is received and processed by Device 1. Device 1 returns a response to the MSS.

At step 15 (optional), when receiving a response from Device 1 for the scripted request, the MSS can examine the response criteria specified in the corresponding scriptedRequest resource that was used to generate the first scripted request to determine how to process the response.

At step 16, the MSS checks the scriptedRequest resource for Device 1 to see if it has any scripted request sequence relationships with other scriptedRequest resources. The MSS may do this by checking to see if a link to another scriptedRequest resource is configured within the scriptedRequest resource for Device 1. In this example, it finds a scripted request sequence relationship to the scriptedRequest resource for Device 2. Based on this, the MSS enables triggers for the generation of a scripted request for Device 2. Once enabled, the MSS then waits for the proper trigger conditions (i.e. time is equal to 1:05 pm) to be met before triggering the generation of a scripted request for Device 2. After generating a scripted request for Device 2, the MSS disables triggers for Device 2 until the next scripted request is processed for Device 1.

At step 17, a request is received and processed by Device 2. Device 2 returns a response to the MSS.

Step 18 (optional) may be the same as step 10.

At step 19, the MSS checks the scriptedRequest resource for Device 2 to see if it has any scripted request sequence relationships with other scriptedRequest resources. The MSS does this by checking to see if a link is configured within the scriptedRequest resource for Device 2 to another scriptedRequest resource. In this case, it finds scripted request sequence relationship to the scriptedRequest resource for Device 3. Based on this, the MSS enables triggers for the generation of a scripted request for Device 3. Once enabled, the MSS then waits for the proper trigger conditions to be met (e.g., time is equal to 1:08 pm) before triggering the generation of a scripted request for Device 3. After generating a scripted request for Device 3, the MSS disables triggers for Device 3 until the next scripted request is processed for Device 2.

At step 20, a request is received and processed by Device 3. Device 3 returns a response to the MSS.

Step 21 (optional) may be the same as step 10.

Step 22 (optional) may be the same as step 9.

Steps 23-31 may be the same as steps 13-21.

In one example, scriptedRequest resources can be used to build RESTful APIs for IoT devices, services and applications. Each API can consist of a set of scriptedRequest resources hosted by the MSS. Each scriptedRequest resource within an API can be used to define an operation supported by the API. For example, an API can be defined for an IoT light switch device. When a light switch registers, the MSS can create scriptedRequest resources automatically on behalf of the light switch. For example, a scriptedRequest resource can be defined to turn a light on and another scriptedRequest resource can be defined to turn a light off. This API can be used by an IoT application. An IoT application can discover these resources and use these resources to interact with the light switch without having to build and send the requests to do so. For example, to turn the light on, the IoT App could send a trigger request (e.g., an update to the scriptedRequest resource's trigger attribute). When receiving the update request, the MSS may then generate a request primitive targeting the IoT light switch. The generated request from the MSS may include all the necessary request parameters required by the IoT light switch. The IoT application however may not need to be aware of any of these parameters. The request that the IoT application sends to the SL may simply be an update request to the scriptedRequest resource's trigger attribute. Thus, the level of abstraction from the perspective of the IoT application could be raised and made more simple and efficient (e.g., smaller messages).

In one example, the MSS can support library(s) of RESTful APIs for common off-the-shelf commercially available devices. These RESTful API can be based on scriptedRequest resources. When an IoT device, service, or application enrolls, registers or connects to the IoT SL, the MSS can perform a lookup to this library based on the type of device, service or application to find a matching API. If a matching API is found, the MSS could instantiate corresponding scriptedRequest resources defined in the API. Within each of these instantiated scriptedRequest resources, the MSS can configure information such as the target. Thereafter, these scriptedRequest resources could serve as an API for applications to discover and communicate with the IoT device, service, or other application.

The Message Scripting Service (MSS) and procedures disclosed herein can be supported as a new oneM2M MSS Common Service Function (CSF) of a oneM2M Common Services Entity (CSE). A CSE's MSS CSF can be exposed and used by other CSEs and/or Application Entities (AEs). Alternatively, the MSS functionality can be incorporated into an existing oneM2M CSF (e.g. Communication Management/Delivery Handling). In one example, the Service Layer (SL) disclosed herein may be a oneM2M CSE, the requestor disclosed herein may be a oneM2M AE or CSE, and the MSS disclosed herein may be a oneM2M MSS CSF.

Figure 9:
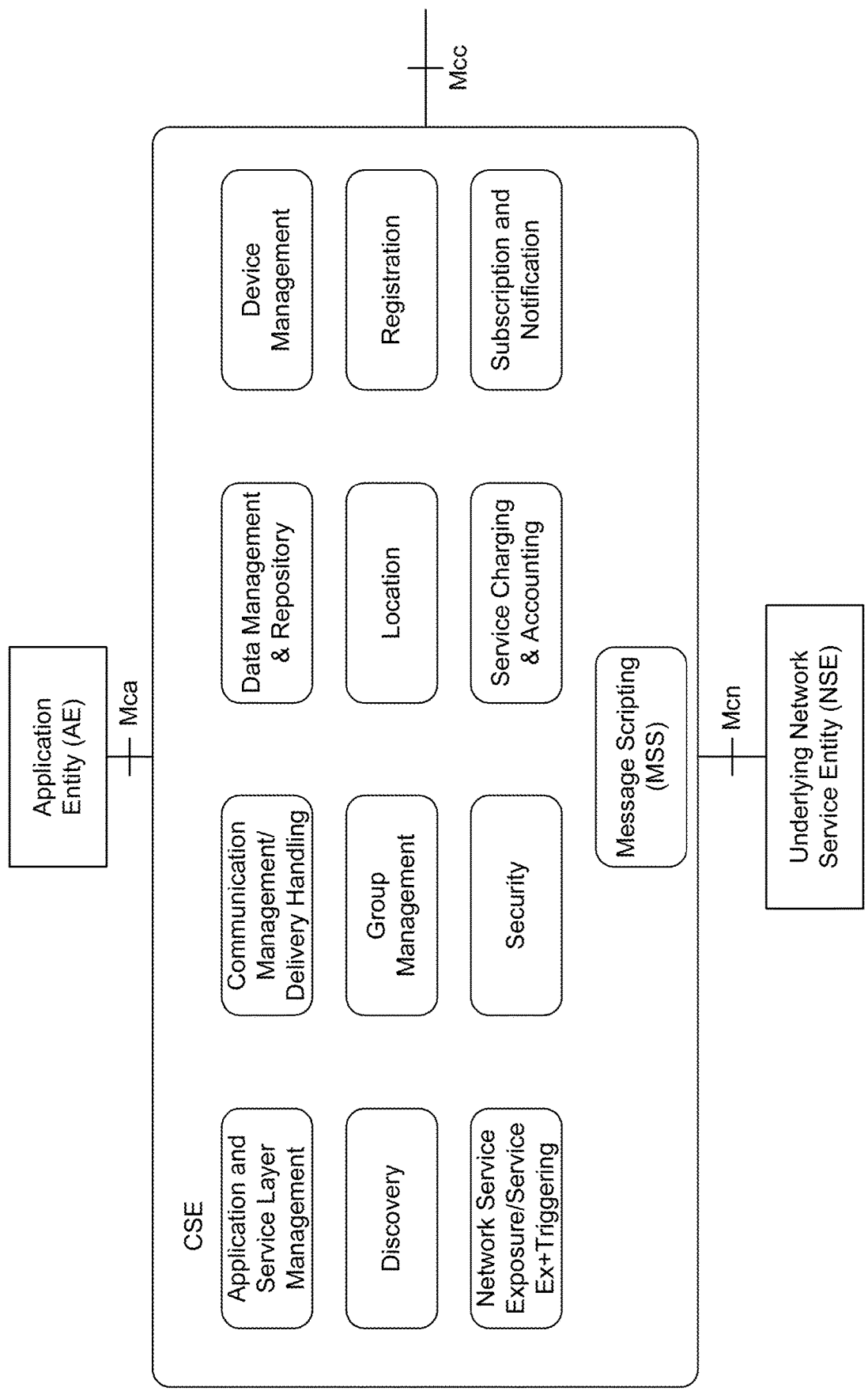
FIG. 9 shows an example of an architecture for a Message Scripting Service as may be implemented in a network compliant with the oneM2M standard.

FIG. 9 shows an example of an architecture for a Message Scripting Service as may be implemented in a network compliant with the oneM2M standard.

A oneM2M <scriptedRequest> resource type is disclosed herein. The <scriptedRequest> resource may be a new resource type. Additionally or alternatively, the disclosed attributes and child resources of the <scriptedRequest> resource can be added as enhancements to the existing oneM2M <request> resource.

When a registrar CSE detects a pattern of requests from one of its registree AEs or CSEs that is a candidate for scripting, it may create one or more <scriptedRequest> resources. These resources may be used to store the necessary information needed by the registrar CSE to generate the scripted requests on behalf of a registree AE or CSE. Additionally or alternatively, an AE or CSE can create a <scriptedRequest> resource.

In support of the scripted request functionality, the child resources specified in Table 1 and the attributes specified in Table 2 may be defined for the oneM2M <scriptedRequest> resource or added to the existing oneM2M <request> resource.

TABLE 1

Proposed <scriptedRequest> child resources

| Child Resource Type | Multiplicity | Description |
| --- | --- | --- |
| <schedule> | 0 . . . 1 | A child resource that contains schedule information that defines the time periods when the Hosting CSE is permitted to generate scripted requests based on the parent <scriptedRequest> resource. |
| <semanticDescriptor> | 0 . . . 1 | A child resource that contains semantic metadata to describe the parent <scriptedRequest> resource. |

TABLE 2

Proposed <scriptedRequest> resource attributes

| Attributes of <scriptedRequest> | Description |
| --- | --- |
| scriptedRequestEnable | When set to "TRUE", the Hosting CSE is permitted to generate scripted requests defined by this resource and on behalf of the request originator. When set to "FALSE" the Hosting CSE will not generate scripted requests defined by this resource. |
| scriptedRequestTrigger | Used by a requestor to manually/explicitly trigger the Hosting CSE to generate a scripted request on its behalf. An update of this attribute will trigger the Hosting CSE to generate a scripted request defined by this resource.<br>A Hosting CSE can support using parameters specified in the trigger request to configure/override parameter settings of this resource and/or system defaults. For example, a Hosting CSE can use trigger request parameters such as From, Request Expiration Timestamp and Operational Execution Time to configure scripted request parameters. This can allow a <scriptedRequest> resource to be more easily used by different request originators. |
| scriptedRequestCriteria | This attribute can contain a list of criteria that the Hosting CSE can use as auto-trigger conditions to generate scripted requests defined by this resource.<br>For example, this list may consist of auto-trigger criteria. Each element in the list can be defined as a triple. Each triple can consist of an attribute, operator and value.<br>An example triple is the following:<br>csebase/ae01/flexContainer01/battery < 10 |

TABLE 2-continued

Proposed <scriptedRequest> resource attributes

| Attributes of <scriptedRequest> | Description |
|---|---|
| | If/when the value of the attribute at the specified path "csebase/ae01/flexContainer01/battery" is less than a value "10", then the Hosting will trigger the generation of a request. If this resource has a child <schedule> resource, then this <schedule> resource can be used to further qualify this attribute. For example, only during the hours of 3:00PM and 4:00PM trigger the generation of a request if the attribute at the specified path "csebase/ae01/flexContainer01/battery" is less than a value "10". The scriptedRequestMaxRate attribute can also be used to further qualify this attribute. |
| scriptedRequestMaxRate | This attribute defines the max rate that the Hosting CSE will generate requests for this resource. The attribute can include values such as: a maximum number of requests that may be generated within a time window, the duration of the time window and minimum interval between requests. When the number of generated requests within the specified window duration exceeds the maximum number, requests may be buffered until the start of the next time window, or may be dropped. |
| responseHandlingOperation | When the Hosting CSE receives a response to a request defined by this resource, this attribute defines whether the Hosting CSE will batch, filter or aggregate the response on behalf of the request originator. This attribute can be configured with values such as BATCH, FILTER, AGGREGATE, NO_RESPONSE, HEARTBEAT. If this attribute is not configured, then the Hosting CSE will not batch, filter or aggregate responses. Instead, all responses will be individually returned to the request originator. |
| responseHandlingConditions | When the Hosting CSE receives a response to a request defined by this resource, this attribute can contain a list of specified response handling conditions used by the Hosting CSE to determine how to filter, batch or aggregate the response. These conditions are only applicable if the responseHandlingOperation is configured with a value of BATCH, FILTER, STORE or AGGREGATE. Example response handling conditions are listed in Table 3. When multiple response handling conditions are specified, then different conditions can be processed using a logical operation (e.g. "AND/OR") based on the conditionOperation specified. |
| responseBatchingRules | When the Hosting CSE performs response batching, it will batch multiple responses into a single response message. This attribute can define the max number of responses to be batched together into a single batched response and the max duration of time to batch responses together into a single batched response. When only the number is specified by the request originator, the Hosting CSE can set a default duration. |
| responseAggregationRules | This attribute can define the max number of responses to be aggregated together into a single aggregated response and the max duration of time to aggregate together responses into a single aggregated response. When only the number is specified by the request originator, the Hosting CSE can set a default duration. This attribute can also specify an aggregation rule that defines the type of aggregation performed by the Hosting CSE's MSS CSF. The MSS CSF can perform aggregation operations on one or more specified elements within the responses it processes such as: Within a specified time duration, analyze one or more response elements in each received response against a specified aggregation criteria and find the response(s) that meet the aggregation criteria. For example, within a specified time duration, find the received response with the minimum value defined for a particular element. Within a specified time duration, count the number of responses having element(s) that match a specified criteria. Within a specified time duration, perform a cumulative operation spanning across all the received responses. For example, perform a cumulative sum or average of one or more elements in a response. |
| responseAggregationResult | If the Hosting CSE performs response aggregation, the result of this aggregation can be stored in this attribute. For example, the Hosting CSE aggregates responses to find the response with a minimum content value observed within a given time window, and can update this attribute with the response having the minimum content value. For example, the Hosting CSE counts the number of |

TABLE 2-continued

Proposed <scriptedRequest> resource attributes

| Attributes of <scriptedRequest> | Description |
|---|---|
| | responses meeting specified criteria and then stores the result in this attribute. A request originator can subscribe to this attribute to receive notifications when the Hosting CSE updates this attribute with aggregation results. Additionally or alternatively, the aggregation result can be stored in another resource and this attribute can provide a link to other resources (e.g. container, contentInstance or flexContainer). |
| responseAggregationSemanticDescription | This attribute can provide a semantic description or a schema description of the response aggregation results contained in the responseAggregationResult. This attribute can be used by both the Hosting CSE to know how to format the responseAggregationResult and AEs wanting to parse and understand the responseAggregationResult. This attribute can be configured with an actual description or a link to a description. |
| nextScriptedRequest | This attribute can be configured with the resource identifier of the next request in a sequence of requests. If configured, the Hosting CSE will next attempt to generate a request for the resource referenced by this attribute when it completes processing of a request for this resource. |
| requestPrimitive | This attribute can be configured with a complete or partial request primitive. This attribute can be configured by a request originator (e.g. AE) or by the Hosting CSE itself. A Hosting CSE uses information contained in this attribute to generate a scripted request on behalf of a request originator. For any elements that are non-configured but required to generate a scripted request, the Hosting CSE can use local default policies to configure. Examples of the types of information that can be included are destination identifiers, security keys or tokens. |
| responseTargets | This attribute can contain a list of one or more targets that the Hosting CSE sends responses for scripted requests to. |
| responsePrimitives | This attribute can contain a list of one or more response primitives that the Hosting CSE may store when receiving and processing responses to scripted requests and the responseHandlingCondition attribute is configured with a value of "STORE". A Hosting CSE may store responses in this attribute, return responses directly to the request originator, or both. A request originator can subscribe to this attribute to receive notifications when the Hosting CSE updates this attribute with a new response primitive. |

TABLE 3

Response Handling Conditions

| Response Handling Conditions | Matching condition |
|---|---|
| Response Status Code | If a response has a Response Status Code parameter matching this specified code, then the Hosting CSE can use this condition to batch, filter or aggregate the response it returns to the request originator or other response targets. |
| From | If a response has a From parameter matching this specified value, then the Hosting CSE can use this condition to batch, filter or aggregate the response to the request originator or other response targets. |
| Content | If a response has a Content parameter having an attribute and value pair matching the attribute, operator, and value triple specified, then the Hosting CSE can use this condition to batch, filter or aggregate the response it returns to the request originator or other response targets. |
| Content Status | If a response has a Content Status parameter matching this specified value (i.e. Full or Partial), then the Hosting CSE can use this condition to batch, filter or aggregate the response it returns to the request originator or other response targets. |
| Event Category | If a response has an Event Category parameter matching this specified value, then the Hosting CSE can use this condition to batch, filter or aggregate the response it returns to the request originator or other response targets. |
| Originating Timestamp | If a response has a Originating Timestamp parameter matching the operator and value pair specified, then the Hosting CSE can use this condition to batch, filter or aggregate the response it returns to the request originator or other response targets. |
| Result Expiration Timestamp | If a response has a Result Expiration Timestamp parameter matching the operator and value pair specified, then the Hosting CSE can use this condition to batch, filter or aggregate the response it returns to the request originator or other response targets. |

TABLE 3-continued

Response Handling Conditions

| Response Handling Conditions | Matching condition |
|---|---|
| Token Request Information | If a response has a Token parameter matching the specified value, then the Hosting CSE can use this condition to batch, filter or aggregate the response it returns to the request originator or other response targets. |
| Authorization Signature Request Information | If a response has an Authorization Signature Request Information parameter matching this specified value, then the Hosting CSE can use this condition to batch, filter or aggregate the response it returns to the request originator or other response targets. |
| conditionOperation | Indicates the logical operation (AND/OR) to be used by the Hosting CSE if multiple response handling conditions are specified. |

A oneM2M scriptedRequestID response parameter can be included by a CSE's MSS CSF in a response. The parameter can be used to indicate to a requestor that a <scriptedRequest> resource has been created for the request corresponding to this response. This parameter can be configured with the resource identifier of a <scriptedRequest> resource. After receiving a response that includes this parameter, a requestor can update the <scriptedRequest> resource to provide its consent to allow the MSS CSF to start scripting requests on its behalf. This consent can be given by setting the scriptedRequestEnable attribute of the <scriptedRequest> resource to a value of TRUE. A requestor can also update other attributes in the <scriptedRequest> resource to re-configure some of the default settings assigned by the MSS CSF. For example, the requestor can re-configure the scriptedRequestCriteria.

A registrar CSE with an MSS CSF may support the capability for its registree AEs and CSEs to specify whether they give their consent to their registrar CSE to generate scripted requests on their behalf.

A registrar CSE may support the capability to allow its registrees to configure a scriptedRequestEnable attribute. This attribute can be configured at the time of registration or sometime thereafter to enable or disable the registrar CSE to script requests on behalf of a registree. This attribute can be defined for an <AE> or <remoteCSE> resource. By setting this attribute to a value of TRUE, a registree AE or CSE can give consent to their registrar CSE to monitor their requests and look for opportunities to script and offload requests on their behalf. Likewise, setting this attribute to FALSE can inform the registrar CSE not to attempt to script and offload requests on their behalf.

A registrar CSE may support the capability to allow its registrees to configure a scriptedRequestNotification attribute at the time of registration or sometime thereafter. This attribute can be used to specify a path (e.g. /scriptedNotifications) which can be appended onto the registree's pointOfAccess (e.g. http://127.25.0.100:80/scriptedNotifications) and where the registrar CSE can send notifications containing offers to script requests for the registree. If this attribute is not used, then a registrar CSE may instead send these types of notifications to the pointOfAccess of the registree.

A registrar CSE with an MSS CSF may support the capability to monitor requests from its registree AEs and CSEs and detect repeated requests and sequences of requests that are candidates for scripting. If detected, and if the scripted request generation capability is enabled (i.e., the registree has its scriptedRequestEnableattribute set to TRUE), the registrar CSE can offer to script future requests on behalf of the request originator(s).

A registrar CSE with an MSS CSF may support one or more configurable <scriptedRequestPolicy> resources that can be used to configure the MSS CSF with criteria. These criteria can be used by a MSS CSF to detect patterns of requests that are candidates for scripting. An example of a oneM2M <scriptedRequestPolicy> resource is described in Table 4.

TABLE 4

Proposed <scriptedRequestPolicy> resource attributes

| Attributes of <scriptedRequest> | Description |
|---|---|
| allowedTimingVariation | Max amount of timing variation allowed between successive requests in a pattern of requests. If the variation in time is exceeded, the pattern is not considered a candidate for scripting by the Hosting CSE. |
| matchingRequestElements | A list of specified request element names and optional values (e.g. target, label, operation, content, etc). For a pattern of requests to be considered repeating and a candidate for scripting by the Hosting CSE, the value of each of the elements in this list must match across all requests in the pattern. |
| applicableRequestOriginators | A list of identifiers of request originators that this policy is applicable to. Can be configured with AE-IDs, CSE-IDs and group-IDs. Wildcard characters (e.g. '*') can also be used. |
| applicableRequestTargets | A list of identifiers of request targets that this policy is applicable to. Can be configured with AE-IDs, CSE-IDs and group-IDs. Wildcard characters (e.g. '*') can also be used. |
| applicableSchedules | A list of identifiers of <schedule> resources. The <schedule> resources may define the time periods when this policy is active and can be used by the Hosting CSE to detect patterns of requests that are candidates for scripting. |

By leveraging policies defined by <scriptedRequestPolicy> resources, a registrar CSE can detect repetitive requests or sequences of requests issued by its registrees. Upon detection, a registrar CSE can create one or more <scriptedRequest> resources and configure the resources with the proper information to enable the registrar CSE to generate scripted requests on behalf of the registree(s). The registrar can notify the registree(s) that it has created one or more <scriptedRequest> resources. This notification can be sent via piggybacking a scriptedRequestOffer response parameter in a response that is returned to a registree. The scriptedRequestOffer parameter can include the resource identifier of a <scriptedRequest> resource. To accept the registrar's offer to script future requests, the registree can set the scriptedRequestEnable attribute of the <scriptedRequest> resource to a value of TRUE to enable scripted requests.

Additionally or alternatively, the registrar CSE can send a scripting offer to a registree via an explicit notification request that it sends to the registree's configured scriptedRequestNotification.

Within this notification, a registrar CSE can include one or more resource identifiers of <scriptedRequest> resources or representations of the <scriptedRequest> resources. To accept the scripting offer, the registree can either provide its consent within the notification response or it can update the <scriptedRequest> resource(s) to enable scripted requests.

Once consent has been given by a registree, the registrar CSE can begin to script requests on behalf of the registree based on the information stored in <scriptedRequest> resource(s).

Figure 10:
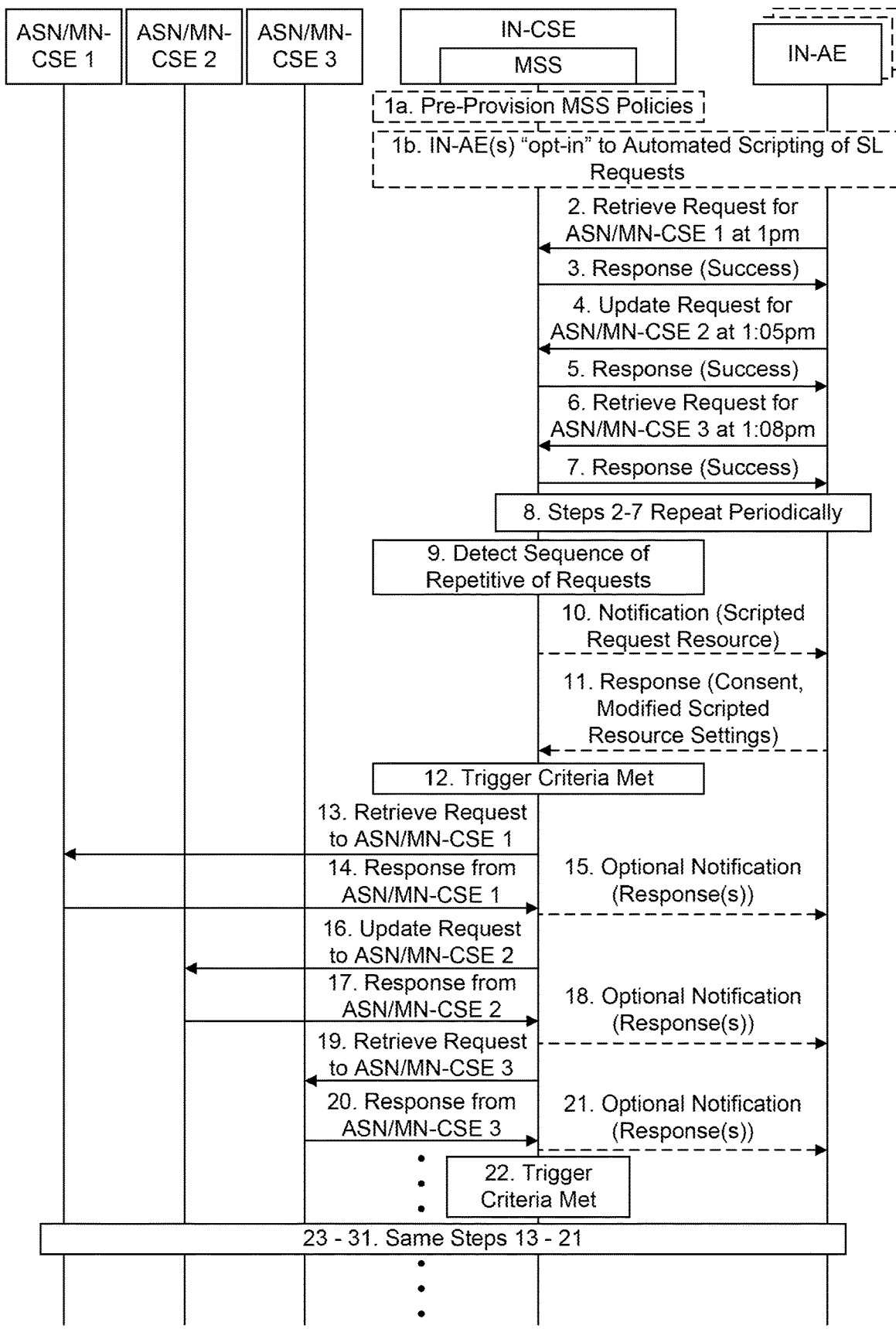
FIG. 10 shows an example of a scripted sequence of requests in accordance with the example oneM2M architecture illustrated in FIG. 9 and described herein.

FIG. 10 shows an example of a scripted sequence of requests in accordance with the example oneM2M architecture illustrated in FIG. 9 and described herein.

At step 1a (optional), the IN-CSE's MSS is configured with one or more <scriptedRequestPolicy> resources that specify rules that the MSS uses to detect a repeating sequence of requests that qualify for automated scripting by the MSS.

At step 1b (optional), the IN-CSE's MSS supports a capability to allow AE's to opt-in/out of automated scripting of request sequences via configuration of the AE's scriptedRequestEnableattribute. If an AE opts-in, then the IN-CSE's MSS can monitor requests received from the AE as well as other AEs (assuming these other AEs also opt-in) to determine whether opportunities exist for the IN-CSE's MSS to perform automated scripting of a repetitive sequence of requests. If an AE opts-out, then the IN-CSE's MSS may not monitor requests received from the AE.

At steps 2-8, one or more requestors start to issue repetitive sequences of requests.

At step 9, the IN-CSE's MSS detects a repetitive sequence of requests. The detection can be based on rules configured within the IN-CSE's <scriptedRequestPolicy> resources as described in Step 1a. Based on the detection of a repetitive sequence of requests, the MSS creates <scriptedRequest> resources for each request in the sequence.

At step 10 (optional), the IN-CSE's MSS can send a notification request to the AE(s) to notify them that the MSS created one or more <scriptedRequest> resources on their behalf. The notification target address of the AE(s) can be configured when the AE(s) opts-in (e.g. during enrollment, registration, etc.) via setting its scriptedRequestNotification attribute. Within the notification, the MSS can include <scriptedRequest> information such as the representation or identifier of one or more <scriptedRequest> resources. This information can be used by the AE to determine which request(s) are applicable to the <scriptedRequest> resource(s) and whether it would like MSS to script requests on its behalf.

At step 11 (optional), to opt-in and give the IN-CSE's MSS consent to have it generate scripted request(s) on its behalf, an AE can return a notification response to the MSS. In the response, the AE can include consent information as well as some updates to settings that the MSS configured in the <scriptedRequest> resource(s). For example, configure the response criteria, configure the request expiration timers, etc.

At step 12, the IN-CSE's MSS monitors the criteria specified within the <scriptedRequest> resources to determine if/when the proper conditions have been met for it to generate a scripted sequence of requests. In this example, the criteria is schedule based (e.g., at 1 pm, the MSS detects that the proper criteria have been satisfied for it to trigger the generation of the first scripted request in the sequence). Note that, although not shown in this example, other criteria can also be specified such as conditions based on the state of other resources hosted by the CSE.

At step 13, the IN-CSE's MSS uses information specified in the first <scriptedRequest> resource in the sequence to generate a scripted request for ASN/MN-CSE 1.

At step 14, a request is received and processed by ASN/MN-CSE 1. ASN/MN-CSE 1 returns a response to the IN-CSE's MSS.

At step 15 (optional), when receiving a response from ASN/MN-CSE 1 for the scripted request, the IN-CSE's MSS can examine the response criteria specified in the corresponding <scriptedRequest> resource that was used to generate the first scripted request to determine how to process the response.

At step 16, the IN-CSE's MSS checks the <scriptedRequest> resource for ASN/MN-CSE 1 to see if it has any scripted request sequence relationships with other <scriptedRequest> resources. The MSS does this by checking to see if a link to another <scriptedRequest> resource is configured within the <scriptedRequest> resource for ASN/MN-CSE 1. In this case, it finds a scripted request sequence relationship to the <scriptedRequest> resource for ASN/MN-CSE 2. Based on this, the IN-CSE's MSS triggers the generation of a scripted request for ASN/MN-CSE 2.

At step 17, a request is received and processed by ASN/MN-CSE 2. ASN/MN-CSE 2 returns a response to the IN-CSE's MSS.

Step 18 (optional) may be the same as step 10.

At step 19, the IN-CSE's MSS checks the <scriptedRequest> resource for ASN/MN-CSE 2 to see if it has any scripted request sequence relationships with other <scriptedRequest> resources. The IN-CSE's MSS does this by checking to see if a link is configured within the <scriptedRequest> resource for ASN/MN-CSE 2 to another <scriptedRequest> resource. In this case, it finds scripted request sequence relationship to the <scriptedRequest> resource for ASN/MN-CSE 3. Based on this, the IN-CSE's MSS triggers the generation of a scripted request for ASN/MN-CSE 3.

At step 20, a request is received and processed by ASN/MN-CSE 3. ASN/MN-CSE 3 returns a response to the IN-CSE's MSS.

Step 21 (optional) may be the same as step 10.

Step 22 (optional) may be the same as step 9.

Steps 23-31 may be the same as steps 13-21.

Figure 11:
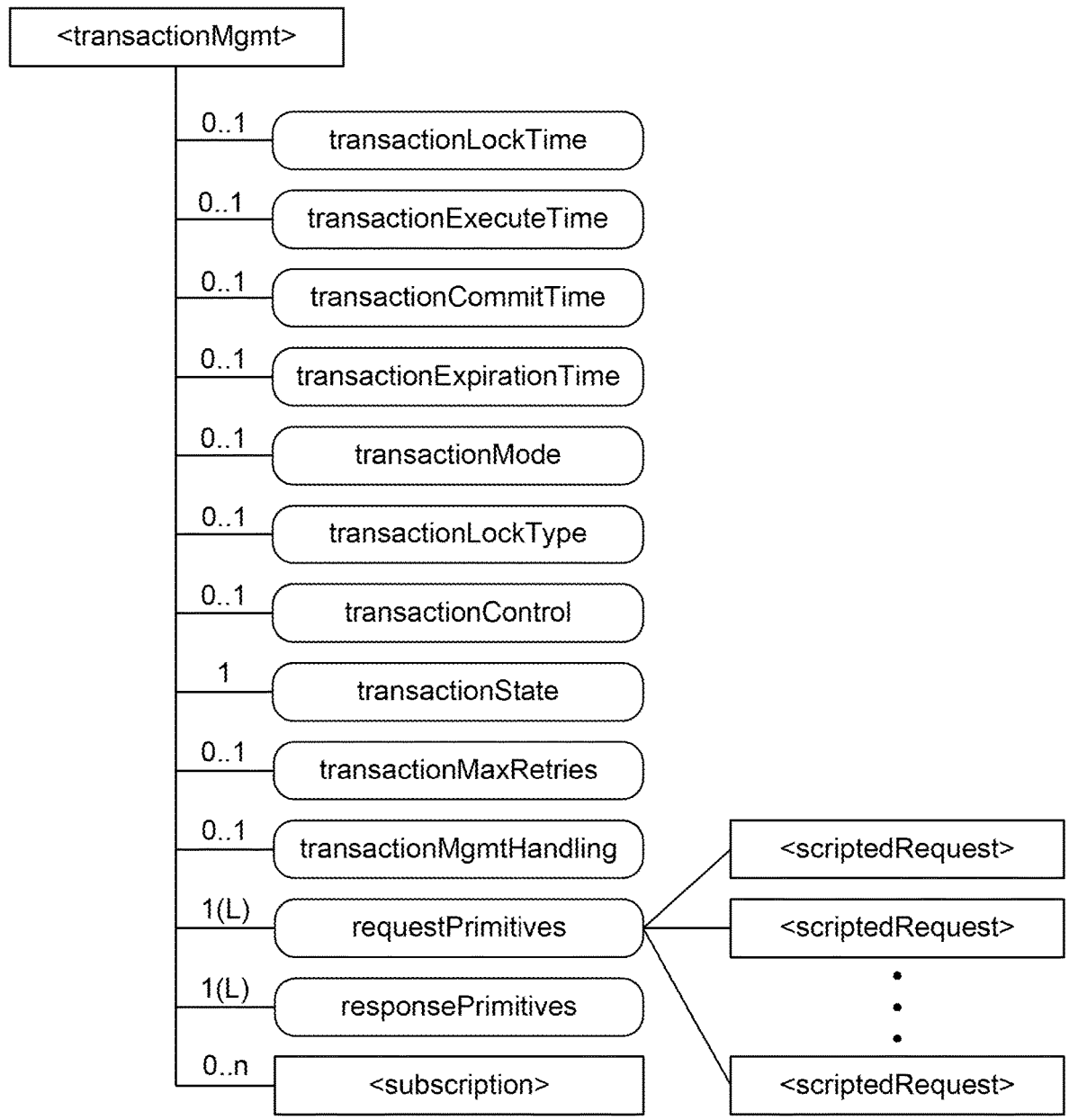
FIG. 11 shows an example of a <transactionManagement> resource.

A oneM2M transaction may consist of a set of oneM2M requests that may need to be executed in an atomic manner with respect to one another. For example, all the requests must execute successfully or none of them must be executed. If one or more of the requests cannot be executed successfully, then the CSE may need to roll back any requests that were successfully executed to return the state of any resources targeted by these requests to their initial state before the requests were executed. Thus the CSE ensures that the set of requests are executed in an atomic manner with respect to one another. To manage the atomic execution of a set of requests, oneM2M defines a <transactionMgmt> resource. An example of the <transactionMgmt> resource is shown in FIG. 11. A registrar CSE supporting MSS capabilities can monitor and detect if a registree AE or CSE executes a repeating transaction consisting of a set of requests that are executed in an atomic manner via <transactionMgmt> resource(s). If detected, a registrar CSE can offer to script the repeating transaction on behalf of the registree. A registrar CSE can create a <scriptedRequest> resource for each request in the set of requests making up the transaction. A registrar CSE can then create a <transactionMgmt> resource and configure its requestPrimitives attribute with the set of <scriptedRequest> resources. Using the <transactionMgmt> resource and the set of <scriptedRequest> resources, the registrar can script the repetitive and atomic execution of the requests making up the transaction.

A <scriptedTransaction> resource may comprise similar attributes to those of the <scriptedRequest> resource. A registrar CSE supporting MSS capabilities can support AEs creating a <scriptedTransaction> resource. A CSE supporting MSS capabilities can support monitoring and detecting if a registree AE or CSE executes a repeating transaction consisting of a set of requests. If detected, a registrar CSE can offer to script the repeating set of requests on behalf of the registree. A registrar CSE can create a <scriptedTransaction> resource that includes the set of individual requests making up the transaction. Using the <scriptedTransaction> resource, the registrar can script the repetitive and atomic execution of the requests making up the transaction.

A oneM2M <subscription> resource may enable an AE to subscribe to a targeted resource and receive a notification if/when an operation occurs on the targeted resource. A <subscription> Hosting CSE supporting MSS capabilities can monitor and detect if a registree AE or CSE executes a repetitive request each time it receives a notification for a given <subscription>. For example, after sending a notification to a registree, the registrar may detect that the registree performs an operation on one or more targets. If detected, a registrar CSE can detect the request(s) as candidate(s) for scripting. The registrar CSE can then create a <scriptedRequest> child resource(s) of the <subscription>. The registrar CSE can configure the scriptedRequestCriteria attribute of the <scriptedRequest> resource(s) to be the same eventNotificationCriteria of the subscription. The CSE can then notify the subscriber of the offer to script the repeating request(s) on behalf of the registree. The registrar CSE can piggyback the scripting offer in the notification associated with the subscription. Alternatively, the registrar CSE can generate a separate scripted request notification containing the scripting offer. The scripting offer can consist of a resource identifier or representation of <scriptedRequest> resource(s). The registrant can accept the offer when returning the notification response or by updating the <scriptedRequest> resource. If accepted, the registrar CSE can generate scripted request(s) each time a notification is generated for the subscription.

A <subscription> Hosting CSE can also allow AEs to create <scriptedRequest> child resources of a <subscription> resource. This can allow AEs to configure a <subscription> hosting CSE to generate customized requests on their behalf if/when <subscription> event criteria have been met. This can allow an AE to offload request generation and response handling to <subscription> Hosting CSEs.

Figure 12:
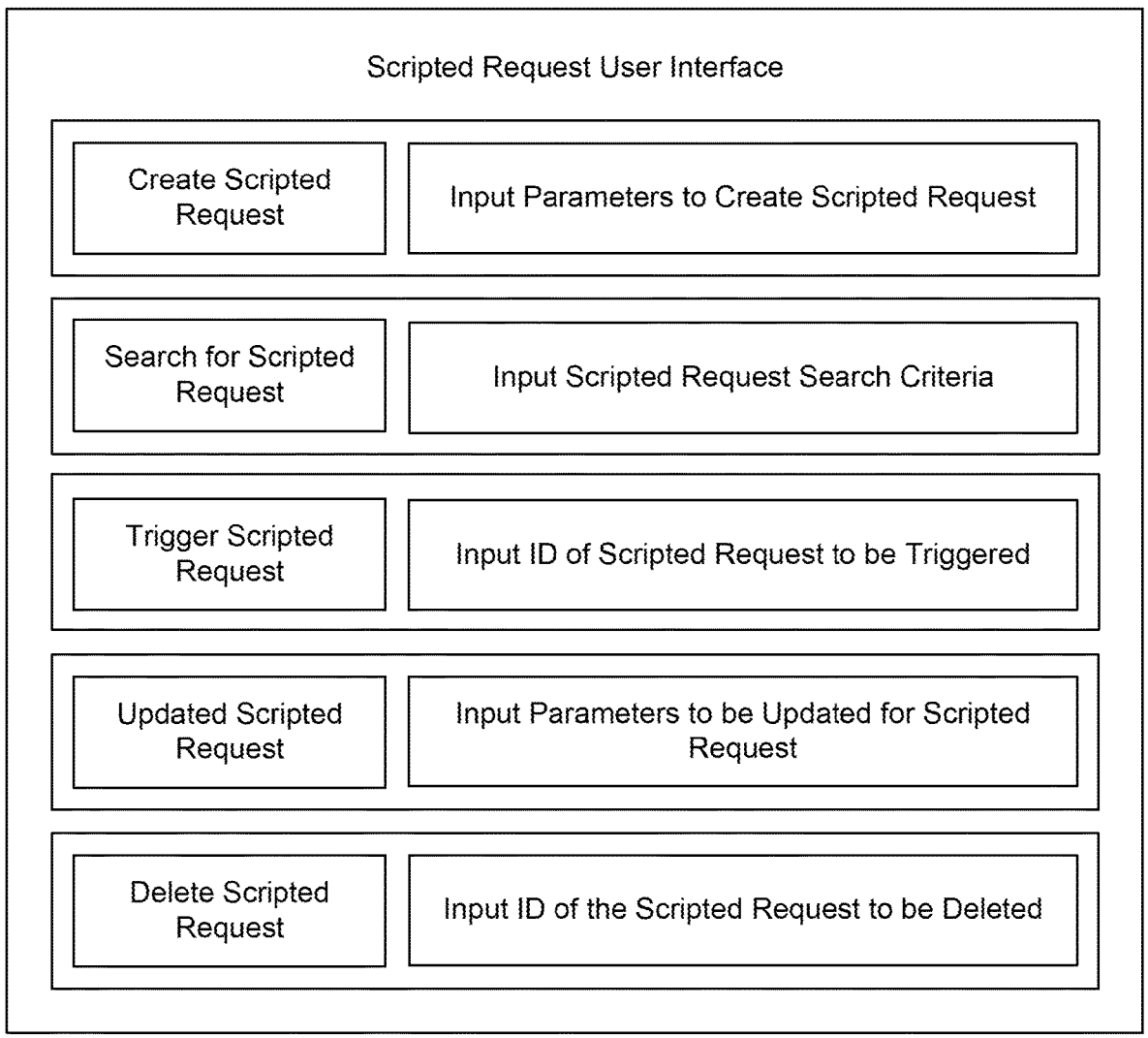
FIG. 12 shows an example user interface for message template management.

FIG. 12 shows an example user interface for scripted request management at a service layer (e.g. a oneM2M CSE). This interface may allow a user or an application to initiate and perform the following example tasks via the CSE: to create a new scripted request, to search for existing scripted requests, to trigger a scripted request, to update a scripted request, and to delete a scripted request.

Figure 13A:
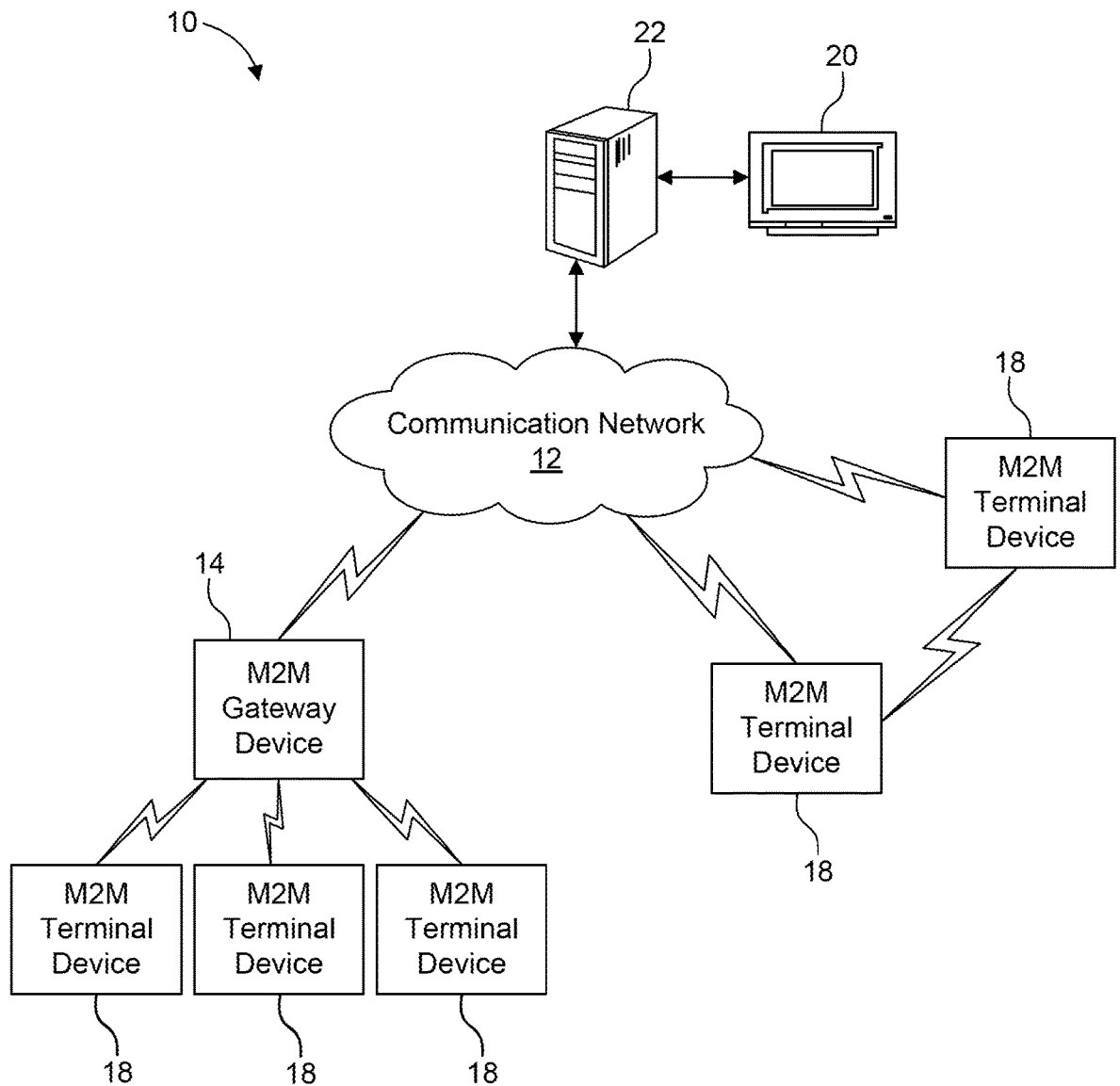
FIG. 13A shows an example system diagram of an example machine-to-machine (M2M) or Internet of Things (IoT) communication system in which one or more disclosed embodiments may be implemented.
Figure 13B:
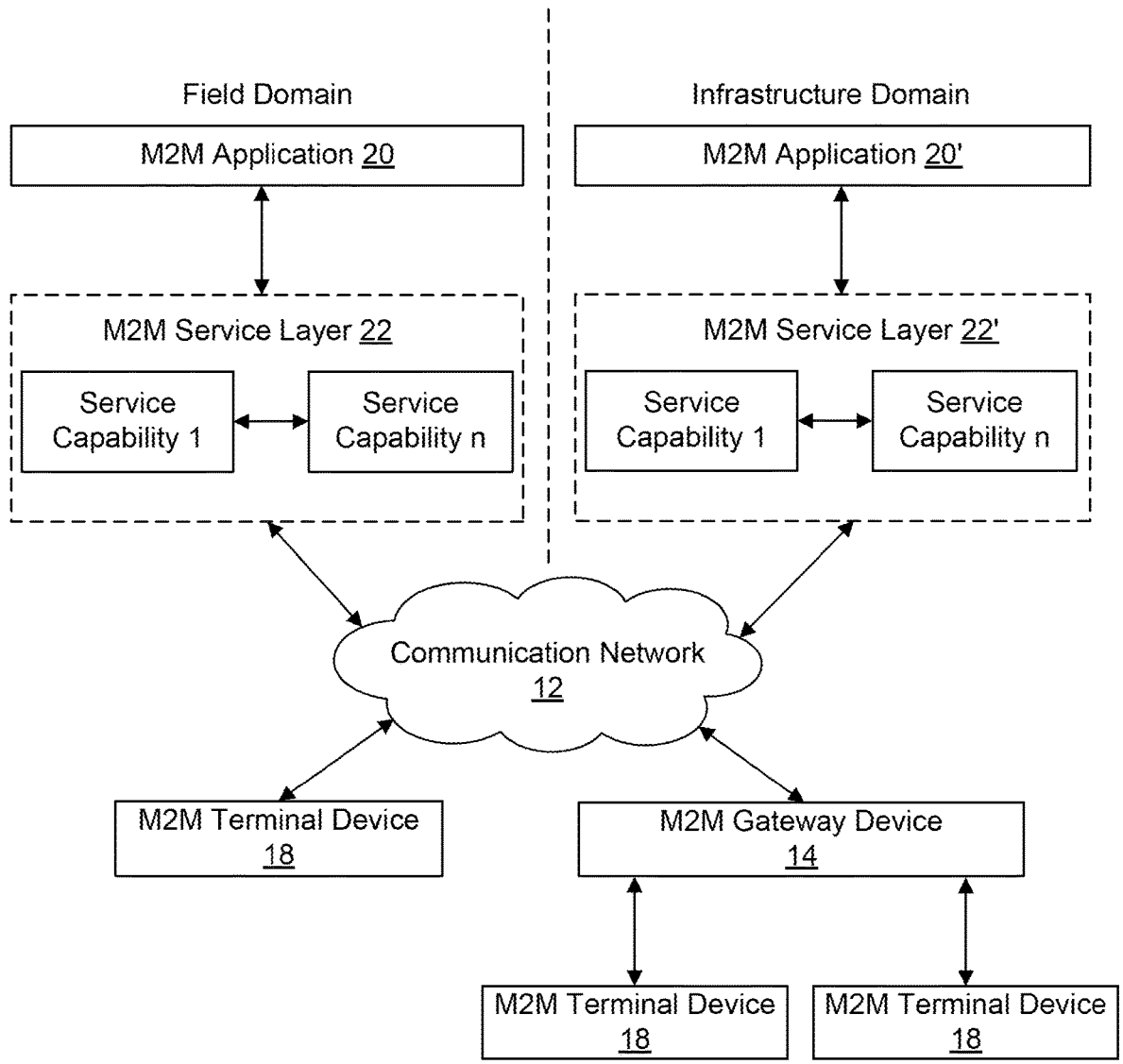
FIG. 13B shows an example system diagram of an example architecture that may be used within the M2M/IoT communications system illustrated in FIG. 13A.
Figure 13C:
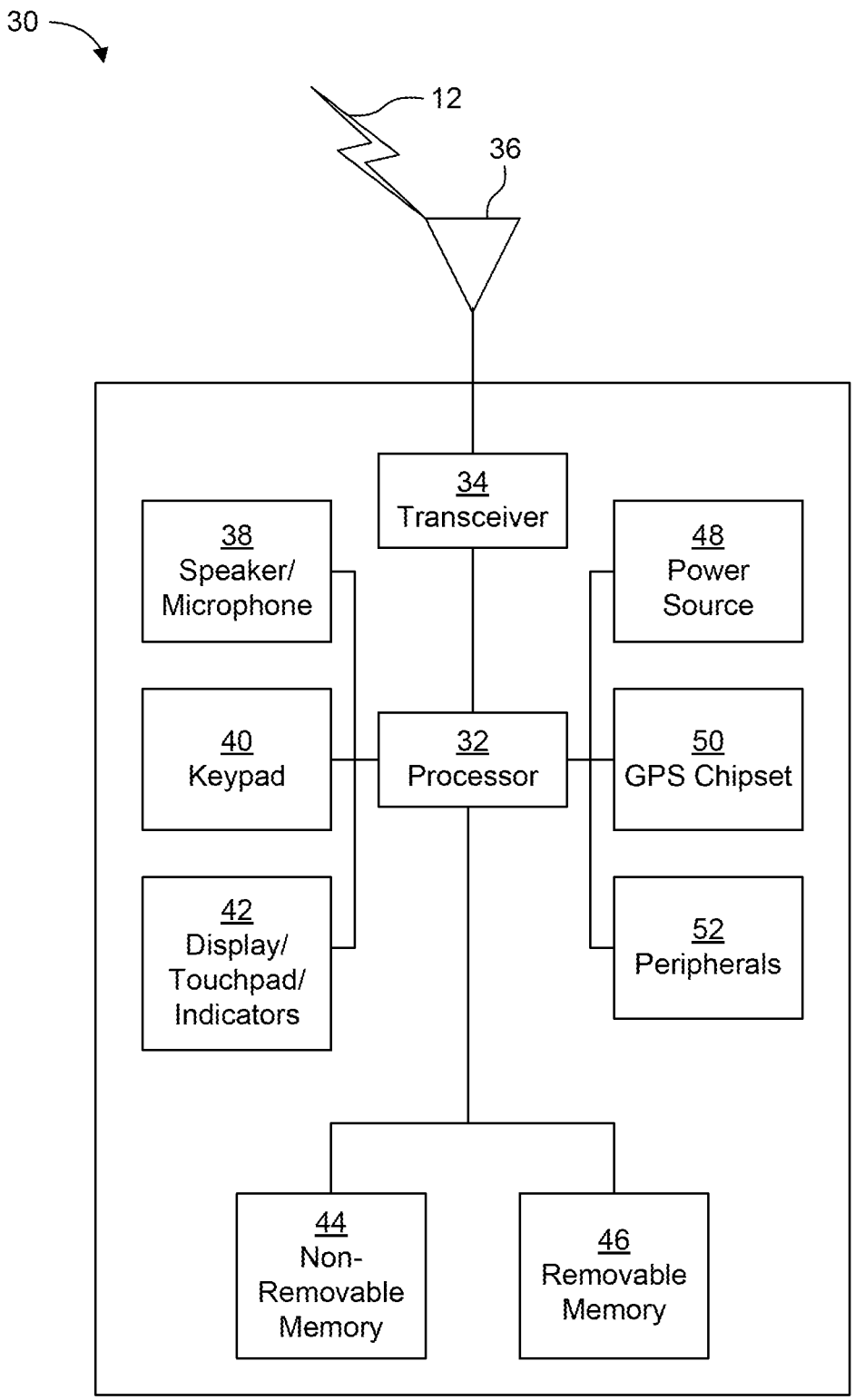
FIG. 13C shows an example system diagram of an example M2M/IoT terminal or gateway device that may be used within the communications system illustrated in FIG. 13A.
Figure 13D:
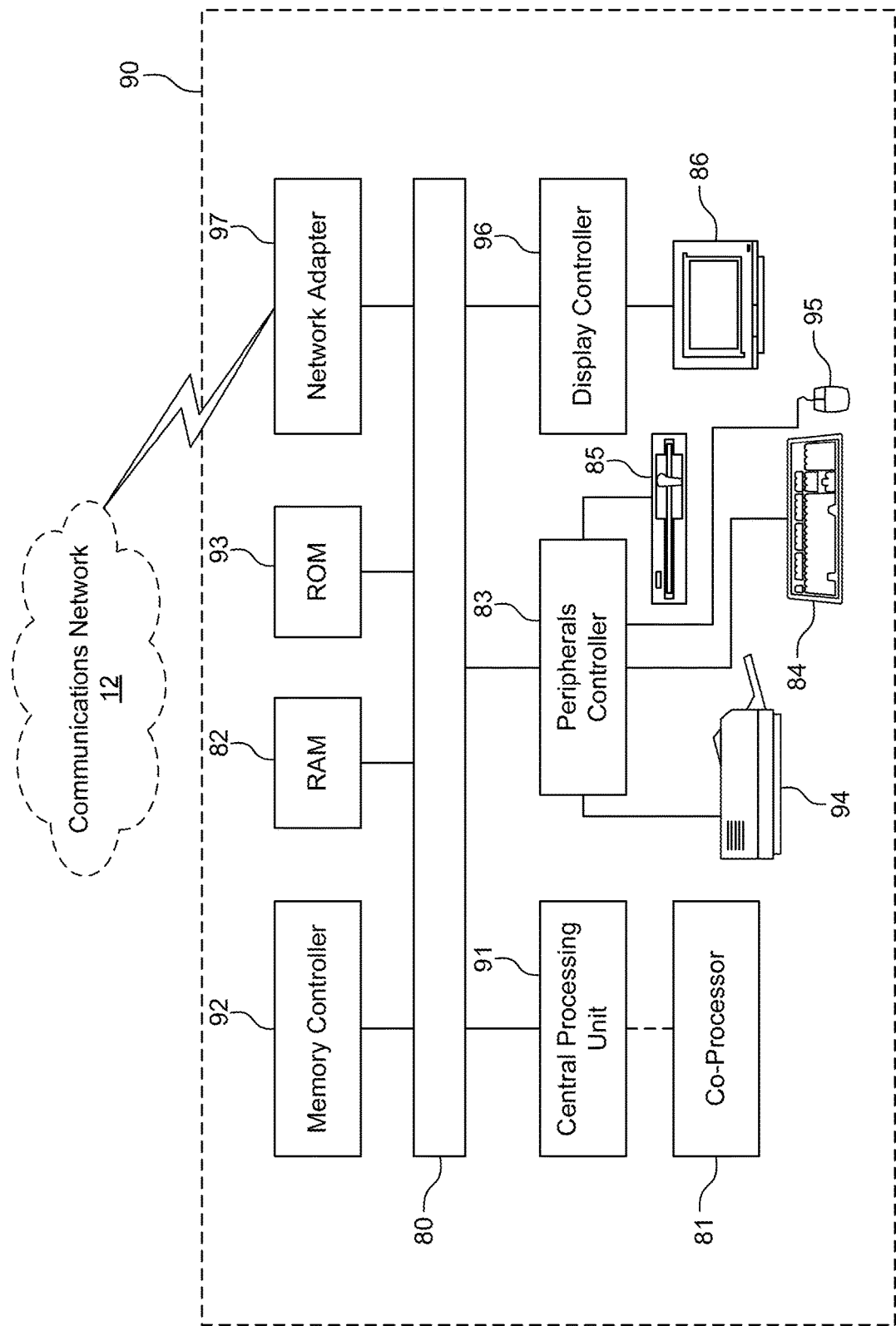
FIG. 13D shows an example block diagram of an example computing system in which aspects of the communication system of FIG. 13A may be embodied.

Any of the entities performing the steps illustrated in FIGS. 2-8 and 10, such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 13C or FIG. 13D. That is, the method(s) illustrated in FIGS. 2-8 and 10 may be implemented in the form of software (i.e., computer-executable instructions) stored in a memory of an apparatus, such as the apparatus or computer system illustrated in FIG. 13C or FIG. 13D, which computer executable instructions, when executed by a processor of the apparatus, perform the steps illustrated in FIGS. 2-8 and 10. It is also understood that any transmitting and receiving steps illustrated in FIGS. 2-8 and 10 may be performed by communication circuitry of the apparatus/entity under control of the processor of the apparatus and the computer-executable instructions (e.g., software) that it executes.

FIG. 13A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-12 may comprise a network apparatus of a communication system, such as the ones illustrated in FIGS. 13A-13D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 13A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 13A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 13B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 13B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 13B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 13C or FIG. 13D described below.

Further, the methods and functionalities described herein may be implemented as part of an M2M network that uses a Service Oriented Architecture (SOA) and/or a Resource-Oriented Architecture (ROA) to access services.

FIG. 13C is a block diagram of an example hardware/software architecture of an apparatus of a network, such as one of the entities illustrated in FIGS. 1-12, which may operate as an M2M server, gateway, device, or other network apparatus in an M2M network such as that illustrated in FIGS. 13A and 13B. As shown in FIG. 13D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for offloading IoT application message generation and response handling described herein, such as the methods operations illustrated and described in relation to FIGS. 2-8 and 10.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 13C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 2-8 and 10) and in the claims. While FIG. 13C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 13C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 13D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 13C is a block diagram of an example computing system 90 which may also be used to implement one or more network apparatuses of a network, such as the entities illustrated in FIGS. 1-12 and described herein, which may operate as an M2M server, gateway, device, or other network apparatus in an M2M network such as that illustrated in FIGS. 13A and 13B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 9D and its accompanying description.

Further, computing system 90 may contain communication circuitry, such as for example a network adaptor 97, that may be used to connect computing system 90 to an external communications network, such as network 12 of FIG. 13A-13D, to enable the computing system 90 to communicate with other apparatuses of the network. The communication circuitry, alone or in combination with the CPU 91, may be used to perform the transmitting and receiving steps described herein (e.g., in FIGS. 2-8 and 10) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

AE Application Entity
CSE Common Service Entity
CSF Common Service Function
IoT Internet of Things
M2M Machine-to-Machine
MSS Message Scripting Service
REST Representational State Transfer
SL Service Layer
URI Uniform Resource Identifier
WoT Web of Things The following is a list of terms and definitions relating to service layer technologies that may appear in the above description. Unless otherwise specified, the terms and definitions used herein refer to the corresponding term listed below:

| Term | Definition |
| --- | --- |
| Service Layer | A protocol layer between applications and application protocol layers. A service layer stores resources and provides services which are exposed to and can be accessed and manipulated by applications and other service layers. |
| Service Layer Request | A message sent from an application (or another service layer) to a service layer to request services provided by the service layer. The service layer processes a received request message and will send a response message to the originator of the request message. |
| Service Layer Response | A message sent from the service layer to an application (or another service layer) as a result of receiving and processing a request message. |
| Scripted Service Layer Request | A request message that is generated by the Service Layer on behalf of a request originator such that the request originator can be offloaded from the burden of generating the request itself. |
| Adaptive control | The mechanism in which a Service Layer's operations can be adjusted to account for changing server conditions. Adjustments typically involve suspending or disabling certain services or operations to limit the loading of the Service Layer. It may also involve resuming or enabling services or operations as the Service Layer recovers more server resources. |
| Memory and Storage | Note that we use the term memory and storage somewhat interchangeably in this paper, however, sometimes there can be distinction between the two terms. Storage often refers to memory that is used to store data values and memory can generically refer to storage or memory that is used to store executable code. |
| Server resources | These are physical or virtual resources present in the operations of a Service Layer that usually are associated with hardware. Physical resources may consist of hardware CPU, memory, storage, network connectivity, etc. and virtual resources can be virtual machines or containers and network functions that realizes a Service Layer, for example, in the cloud. |
| Service Layer adaptation | A term used to signify the Service Layer is running in a reduced, functional state from its normal operations. This may be a result of the proposed adaptive control that is activated by one or more SL adaptation rules. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method implemented by a service supporting capabilities through a set of Application Programming Interfaces (APIs), the method comprising:
  receiving, from a first entity, a plurality of requests to communicate with a second entity;
  determining that two or more of the plurality of requests to communicate with the second entity form a pattern of repetitive requests;
  based on determining that two or more of the plurality of requests to communicate with the second entity form the pattern of repetitive requests, creating and storing a scripted request resource, wherein the scripted request resource enables the service to create and send scripted requests to the second entity on behalf of the first entity, wherein the scripted request resource comprises one or more conditions for triggering the creation of one or more scripted requests, and wherein the scripted request resource further comprises an identifier of a schema comprising information defining at least the ordering of elements and data type definitions of values of the elements of a valid scripted request;
  creating and sending, to the second entity, based on determining that one or more of the conditions for triggering the generation of the one or more scripted requests has been satisfied and based on the identified schema, a plurality of scripted requests;
  sending, to the first entity, an indication that the scripted request resource has been created and an identifier associated with the scripted request resource;
  receiving, from the second entity, a plurality of responses to the plurality of scripted requests;
  processing, at the service and based on one or more response parameters identified in the scripted request resource, the plurality of responses, wherein the processing comprises at least aggregating the plurality of responses; and sending, to the first entity, the processed responses.

2. The method of claim 1, wherein the plurality of scripted requests are used by the service to communicate information to the second entity automatically on behalf of the first entity.

3. The method of claim 1, wherein the service is configured with one or more policies that enable the service to determine whether the plurality of requests to communicate with the second entity form the pattern of repetitive requests.

4. The method of claim 1, further comprising receiving, from the first entity, an instruction to automatically create the scripted request resource based on determining at the service that two or more of the requests to communicate with the second entity form the pattern of repetitive requests.

5. The method of claim 1, further comprising:
receiving, from the first entity, a request to update a condition of the scripted request resource; and
updating, based on the request to update the condition of the scripted request resource, the condition of the scripted request resource.

6. The method of claim 1, wherein the information, of the identified schema, further comprises one or more of:
information indicative of which of the one or more elements of the valid scripted request are mandatory; or
information indicative of which of the one or more elements of the valid scripted request are optional.

7. An apparatus comprising:
one or more processors; and
memory storing computer-executable instructions which, when executed by the one or more processors, implement a service supporting capabilities of a communications network through a set of Application Programming Interfaces (APIs) and cause the service to perform operations comprising:
receiving, from a first entity, a plurality of requests to communicate with a second entity;
determining that two or more of the plurality of requests to communicate with the second entity form a pattern of repetitive requests;
based on determining that two or more of the plurality of requests to communicate with the second entity form the pattern of repetitive requests, creating and storing a scripted request resource, wherein the scripted request resource enables the service to create and send scripted requests to the second entity on behalf of the first entity, wherein the scripted request resource comprises one or more conditions for triggering the creation of one or more scripted requests, and wherein the scripted request resource further comprises an identifier of a schema comprising information defining at least the ordering of elements and data type definitions of values of the elements of a valid scripted request;
creating and sending, to the second entity, based on determining that one or more of the conditions for triggering the generation of the one or more scripted requests has been satisfied and based on the identified schema, a plurality of scripted requests;
sending, to the first entity, an indication that the scripted request resource has been created and an identifier associated with the scripted request resource;
receiving, from the second entity, a plurality of responses to the plurality of scripted requests;
processing, at the service and based on one or more response parameters identified in the scripted request resource, the plurality of responses, wherein the processing comprises at least aggregating the plurality of responses; and sending, to the first entity, the processed responses.

8. The apparatus of claim 7, wherein the plurality of scripted requests are used by the service to communicate information to the second entity automatically on behalf of the first entity.

9. The apparatus of claim 7, wherein the service is configured with one or more policies that enable the service to determine whether the plurality of requests to communicate with the second entity form the pattern of repetitive requests.

10. The apparatus of claim 7, wherein the instructions, when executed, further cause the service to perform operations comprising receiving, from the first entity, an instruction to automatically create the scripted request resource based on determining at the service that two or more of the requests to communicate with the second entity form the pattern of repetitive requests.

11. The apparatus of claim 7, wherein the instructions, when executed, further cause the service to perform operations comprising:
receiving, from the first entity, a request to update a condition of the scripted request resource; and
updating, based on the request to update the condition of the scripted request resource, the condition of the scripted request resource.

12. The apparatus of claim 7, wherein the information, of the identified schema, further comprises one or more of:
information indicative of which of the one or more elements of the valid scripted request are mandatory; or
information indicative of which of the one or more elements of the valid scripted request are optional.

13. A computer-readable storage medium storing computer-executable instructions which, when executed by a processor of a service supporting capabilities through a set of Application Programming Interfaces (APIs), cause the service to perform operations comprising:
receiving, from a first entity, a plurality of requests to communicate with a second entity;
determining that two or more of the plurality of requests to communicate with the second entity form a pattern of repetitive requests;
based on determining that two or more of the plurality of requests to communicate with the second entity form the pattern of repetitive requests, creating and storing a scripted request resource, wherein the scripted request resource enables the service to create and send scripted requests to the second entity on behalf of the first entity, wherein the scripted request resource comprises one or more conditions for triggering the creation of one or more scripted requests, and wherein the scripted request resource further comprises an identifier of a schema comprising information defining at least the ordering of elements and data type definitions of values of the elements of a valid scripted request; and
creating and sending, to the second entity, based on determining that one or more of the conditions for triggering the generation of the one or more scripted requests has been satisfied and based on the identified schema, a plurality of scripted requests;
sending, to the first entity, an indication that the scripted request resource has been created and an identifier associated with the scripted request resource;
receiving, from the second entity, a plurality of responses to the plurality of scripted requests;

processing, at the service and based on one or more response parameters identified in the scripted request resource, the plurality of responses, wherein the processing comprises at least aggregating the plurality of responses; and sending, to the first entity, the processed responses.

14. The computer-readable storage medium of claim 13, wherein the plurality of scripted requests are used by the service to communicate information to the second entity automatically on behalf of the first entity.

15. The computer-readable storage medium of claim 13, wherein the service is configured with one or more policies that enable the service to determine whether the plurality of requests to communicate with the second entity form the pattern of repetitive requests.

16. The computer-readable storage medium of claim 13, wherein the instructions, when executed, further cause the service to perform operations comprising receiving, from the first entity, an instruction to automatically create the scripted request resource based on determining at the service that two or more of the requests to communicate with the second entity form the pattern of repetitive requests.

17. The computer-readable storage medium of claim 13, wherein the instructions, when executed, further cause the service to perform operations comprising:

receiving, from the first entity, a request to update a condition of the scripted request resource; and updating, based on the request to update the condition of the scripted request resource, the condition of the scripted request resource.

18. The computer-readable storage medium of claim 13, wherein the information, of the identified schema, further comprises one or more of:

information indicative of which of the one or more elements of the valid scripted request are mandatory; or information indicative of which of the one or more elements of the valid scripted request are optional.

* * * * *